US007953402B2

(12) United States Patent
Carolan et al.

(10) Patent No.: US 7,953,402 B2
(45) Date of Patent: May 31, 2011

(54) REMOTE ACTIVATION SYSTEM

(76) Inventors: Laurence Carolan, Ilford (GB); Gerd Kaesmeier, Ober-Ramstadt (DE)

( * ) Notice: Subject to any disclaimer, the term of this patent is extended or adjusted under 35 U.S.C. 154(b) by 431 days.

(21) Appl. No.: 11/989,162

(22) PCT Filed: Sep. 30, 2005

(86) PCT No.: PCT/GB2005/003757
§ 371 (c)(1),
(2), (4) Date: Jan. 26, 2009

(87) PCT Pub. No.: WO2007/010175
PCT Pub. Date: Jan. 25, 2007

(65) Prior Publication Data
US 2010/0222031 A1 Sep. 2, 2010

(30) Foreign Application Priority Data

Jul. 22, 2005 (GB) .................................. 0515113.9

(51) Int. Cl.
*H04M 3/42* (2006.01)
*G08C 19/00* (2006.01)
(52) U.S. Cl. ...................... 455/419; 455/414.1; 455/420; 340/825.69
(58) Field of Classification Search ................ 455/414.1, 455/466, 418–420; 340/825.69–825.72; 379/93, 102
See application file for complete search history.

(56) References Cited

U.S. PATENT DOCUMENTS

| 5,809,118 A * | 9/1998 | Carmello et al. ........ 379/102.02 |
| 6,351,524 B1 * | 2/2002 | Schuster et al. ........... 379/88.23 |
| 2006/0158339 A1 * | 7/2006 | Brundula .................. 340/686.1 |

FOREIGN PATENT DOCUMENTS

| DE | 20022044 U1 | 6/2001 |
| EP | 1239360 A1 | 11/2002 |
| GB | 2116807 A | 9/1983 |
| JP | 2004104462 | 4/2004 |
| WO | 0157824 A | 8/2001 |

OTHER PUBLICATIONS

TCS EasyGate; http://web.archive.org/web/20020124193120/www.dpspro.com/easygate.html; Jan. 24, 2002.*

(Continued)

*Primary Examiner* — Kent Chang
*Assistant Examiner* — Kashif Siddiqui
(74) *Attorney, Agent, or Firm* — Stetina Brunda Garred & Brucker

(57) ABSTRACT

A method for remotely activating an event over a telecommunications network, said method comprising: providing processing means connected to a telecommunications transceiver and having an output for activating an event; and connecting the transceiver to the network, such that it is able to receive a connection request from a user; the processing means and transceiver being configured to: receive a connection request; wait for a predetermined time period; refuse the connection request; and activate the event.

Also provided is a device for enabling an event to be remotely activated over a telecommunications network, said device comprising: processing means connected to a telecommunications transceiver and having an output for activating the event; wherein the transceiver is operable to receive a connection request from a user, and wherein the processing means are operable, on receipt of a connection request, to: wait for a predetermined time period; refuse the connection request; and activate the event.

7 Claims, 20 Drawing Sheets

OTHER PUBLICATIONS

Remote Control via Mobile Phone Kit MK160; http://web.archive.org/web/20041016101210/apogeekits.com/remote_control_via_cell_phone.htm; Oct. 15, 2004.*

TCX-Easygate Standard v2.3; DPS-Promatic; Sep. 19, 2010.*

Remote Control by Telephone—K6501; http://web.archive.org/web/20040120180302/www.vellemanusa.com/Product.asp?lan=&id=9321; Nov. 26, 2003.*

* cited by examiner

REMOTE ACTIVATION SYSTEM

The present invention relates to a system for remotely activating an event via a telecommunications network, and to other remote control and remote communication methods via networks. It is particularly applicable, but by no means limited, to enabling a door, gate or shutter to be opened or closed via a mobile phone network.

BACKGROUND TO THE INVENTION

It is often desirable to be able to cause an event to occur using remote control. By way of example, much of the present disclosure will refer to the event being the opening or closing of a door, gate or industrial shutter. However, the present disclosure is applicable to many other remotely-controlled events, and additional examples are provided.

In the case of an industrial shutter, for example at a loading bay entrance of a warehouse, it is often desirable for a user to be able to open or close the shutter by remote control. For example, the user may be driving a vehicle and, as he approaches the shutter, he may find that the shutter is closed. Operation of the shutter by remote control saves the user the inconvenience of stopping his vehicle, disembarking from it, opening the shutter, getting back into the vehicle and then driving further. Thus, the user saves time and, if it is raining, does not get wet. He is also able to remain safely inside his vehicle, which keeps him from potential danger, and means that the vehicle and contents are not left unattended.

There are two main types of known remote control systems suitable for opening a door, shutter or gate, etc. The first type, which may be referred to as "local" remote control, operates by sending a wireless (e.g. infra-red or radio frequency) signal from a handheld transmitter (or a transmitter mounted within a vehicle) to a receiver which is connected to door opening equipment (e.g. a motor). Such "local" systems have the disadvantage that every user needs a dedicated transmitter, and also the user needs to be in relatively close proximity to the door to be opened, in order for the door opening signal to be able to reach the receiver. Close proximity to the door is also necessary to enable the user to see whether the door is already open—in which case there would be no need for him to open it. Another disadvantage of "local" remote control systems is that no information can be sent back to the user, as the receiver-side apparatus does not include a transmitter.

The second type, which may be referred to as "network-based" remote control, uses a telecommunications network to transmit an instruction from the user to the door opening equipment, to cause the door to open. A commercially available example of such a system is available from DPS-Promatic srl, via Edison 21, 47100 Forlì, Italy, and is marketed under the name "Easygate" (www.dpspro.com/easygate-.html). The Easygate system enables a user to open a gate using a mobile telephone. With the Easygate system, a GSM (Global System for Mobile Communications) receiver having a SIM (Subscriber Identity Module) is connected to control circuitry and a door opening motor. In use, a user uses a phone (which may be a mobile telephone, although not necessarily so) to dial the telephone number which corresponds to the SIM number of the system's GSM receiver. By dialling this number, the user causes a connection request to be sent to the system's GSM receiver. To save the user the cost of a phone call (in many countries), the Easygate system does not answer this incoming connection request, but instead instantly rejects the connection request. The Easygate system determines if the phone number of the user's phone is on a list of authorised numbers, and if it is, the system opens the door.

When the user dials the number of the Easygate system, the system does not provide the user with any confirmatory feedback via the telephone network, or any information regarding the status of the system. Having dialled the number, the user does not know whether the gate is being opened, or whether the gate is, for some reason, already open. The Easygate system is designed only to be used to open a gate, and not to close it, since by the system only acting to open the gate the Easygate user is provided with certainty that, after the Easygate number has been dialled, the gate will either be opened or will already be open.

The absence of any feedback with the Easygate system also means that, in practice, a user will tend not to use the Easygate system unless he is already within eyeshot of the gate to be opened, since this enables the user to see whether the gate is already open, before deciding whether it is necessary to use the Easygate system. Moreover, if he does use the system, being within eyeshot of the gate enables him verify that the gate has been successfully opened, and that no obstacle (or even a person) is in the way.

Accordingly, there is a desire for a network-based remote control system that can be used both to open and to close a door or the like, and which provides the user with some kind of feedback to confirm the remote action the system is performing.

SUMMARY OF THE INVENTION

According to a first aspect of the present invention there is provided a device for opening or closing a member such as door, a window, a shutter, a curtain, a gate or a barrier said device comprising:
  a telecommunications receiver operable to receive a connection request from a user, memory means for storing the state an article was in prior to the receipt of the connection request, and
  processing means connected to a telecommunications transceiver and having an output for activating an opening or closing event;
    and wherein the processing means are operable, on receipt of a connection request, to:
    wait for a predetermined time period which time period is automatically varied dependant on the state the article was in prior to the receipt of the connection request;
    refuse the connection request; and
    activate the event.
  whereby a member such as a door, a window, a shutter, a curtain, a gate or a barrier is openable or closeable remotely by communication over a telecommunications network and whereby the open or closed status of the member is fed back to the user via the telecommunications network by the automatic variation in the said predetermined time period.

The time period may be measured in seconds or in terms of ring cycles in the telecommunications system or by some other measure.

As with the Easygate system, the process of sending a connection request from a user may be performed by the user telephoning the present system. Also, as with the Easygate system, the present invention refuses the connection request, and so the user is not charged (in many countries) for calling the system. However, the system waiting for a predetermined time period before refusing the connection request is an important point of distinction provided by the present invention. Once the system has received the incoming connection request, by waiting before refusing the connection request, the user will hear ring tones for a time period corresponding to the duration of the wait. Highly advantageously, the length of this time period (i.e. the duration of ring tones heard) can be used to convey information to the user relating to the action the system is to perform, and/or the status of the system.

Thus, by virtue of this wait or delay, the user can be provided with feedback or other information, but because the incoming connection request is then refused, the user still does not incur a connection charge (in many countries). The user must understand in advance the significance of the duration of the ring tones, but once this is understood the ring tone duration may be used to convey a variety of pieces of information to the user without him incurring a connection charge.

The term "event" as used herein should be interpreted broadly, to encompass both activating and deactivating an article, device or such like, and generally performing any kind of remotely controlled action.

Preferably the event is a transition of an article from a first state to a second state or vice versa, and the method further comprises storing, in memory means, the state the article was in prior to the receipt of the connection request. This advantageously enables the present system to be used for two-state or reversible events, such as the opening and closing of a door.

By arranging for the processing means to set the predetermined time period according to the state the article was in prior to the receipt of the connection request, the duration of the wait period, and consequently the duration of ring tones heard by the user, may be set by the processing means in order to convey the appropriate feedback or status information to the user.

Preferably the said time period is set to a first time period if the article was in the first state prior to the receipt of the connection request, or is set to a second time period if the article was in the second state prior to the receipt of the connection request. By way of example, the first time period may be relatively long, and the second time period may be relatively short.

In one embodiment, used for opening or closing a gate, door or industrial shutter, a long duration of ring tones indicates the door is closed and will be opened, whereas a short duration of ring tones indicates the door is open and will be closed.

Preferably, the device detects that the user has terminated the connection request during the said predetermined time period; and, in response, not activating the event. The provision of the wait before refusing the connection request, and the status information conveyed to the user via the duration of the wait, advantageously enable the user to consider and appreciate the event that the system is about to activate, and enable the user to abort the event by "hanging up" or otherwise terminating the connection request.

The event may be the opening or closing of an article (e.g. a door, window, shutter, gate or barrier), wherein the first state is the article closed, and the second state is the article open.

Alternatively the event may be the switching on or switching off of an article (e.g. a light or an electrical device), wherein the first state is the article switched on, and the second state is the article switched off.

The event may alternatively be the summoning of a lift or elevator, which has significant benefits for disabled users who are unable to reach a wall-mounted call button.

The device may be arranged to return status information to a user, the status information being selected from a group containing input from a sensor for detecting status of the member such as an error or incident in the vicinity of the member prior to the activation of the event and the stored the state the article was in prior to the receipt of the connection request. For example, the device may return information about how many times the device had been activated or about an intermediate state between open and closed, such as a percentage open or closed. This type of information may be sent back to the user via an SMS message for example.

Preferably the telecommunications network comprises a telephone network, and the method further comprises identifying the telephone number from which the connection request originated. It will be appreciated that either mobile or land-based telephones and telephone networks may be used. Moreover, it will also be appreciated by those skilled in the art that other types of networks could also be used, such as a data communications network (e.g. a local area network, a wide area network or the internet).

The processing means may compare the said telephone number with a list of authorised telephone numbers, and only activate the event if the said telephone number is on the said list. This provides the advantage that only authorised phones may be used to activate the event. However, the system may be configured such that any phone (regardless of its number) may be used to activate the event, even if the phone withholds its number.

Preferably the processing means are configured to set said time period to a first time period if the article was in the first state prior to the receipt of the connection request, and to set said time period to a second time period if the article was in the second state prior to the receipt of the connection request.

Preferably the processing means are further configured to detect that the user has terminated the connection request during the said predetermined time period; and, in response, are configured not to activate the event.

Preferably the processing means are configured to receive input from a sensor for detecting an error or incident in the vicinity of the article prior to the activation of the event, the processing means being further configured not to activate the event in response to such an error or incident.

Preferably the processing means are further configured to set the said time period to a third time period if the said sensor detects an error or incident in the vicinity of the article prior to receiving the connection request.

The device may be operable to open or close a door, a window, a shutter, a curtain, a gate or a barrier. Alternatively it may be operable to activate or deactivate a light or another electrical device, or to cause a lift to be summoned, etc.

Preferably the processing means are further configured to identify the telephone number from which a connection request originates.

Preferably the processing means are further configured to compare the said telephone number with a list of authorised telephone numbers, and only to activate the event if the said telephone number is on the said list. The device may further comprise user interface means operable to cause the said telephone number to be added to or removed from a list of authorised telephone numbers.

The system may be configured to allow certain actions for certain users (i.e. from certain phone numbers) only. For example, phone number 1 may be allowed to control all doors, phone number 2 may only be allowed to open the entrance door, phone number 3 may be allowed to operate the system weekdays form 7.00 am to 6.30 pm, phone number 4 may be allowed only to operate the system at weekends, etc. Additionally, different actions in remote places can be activated at the same time, e.g. a plurality of different doors can be opened with one call only.

Preferably the processing means are configured to receive input from a sensor for detecting an error or incident in the vicinity of the article during the event; the processing means being further configured to stop the event, if possible, in response to such an error or incident, and to notify the user via the network. This advantage arises as a consequence of the present remote control system having both a receiver and a transmitter at both the user's location and at the remote location. This should be contrasted with local remote control systems, which tend only to have only a transmitter with the user and only a receiver at the remote location, and hence would not be able to provide this greater functionality.

Preferably the device further comprises data storage means for storing details of the event. The data storage means may also be used to assign certain tasks to different users (i.e. to different phone numbers).

Another such system could be responsive to incoming text messages/SMS messages. The use of text messages advantageously enables the remote control functions to be significantly extended, and enables the use of different inputs and outputs. In use, a Bluetooth® or infra-red connection could connect the "slave" mobile phone to the device it is to control (e.g. a domestic lighting and heating control unit). A number of different commands could be included in a single text message. Logical operators and/or conditions could also be included. Thus, for example, a text message could be sent from the remote user reading: "Switch on lights in room 1, 3, 6 . . . , switch off lights in room 8, 9 . . . , if temperature is below 18C turn on heating . . . "

Different actions could thus be started by a user sending a single text message to the "slave" mobile phone. The "slave" mobile phone could then send different pieces of status information and/or confirmatory information to the user's remote phone, optionally in a single text message.

The processing means may be arranged to return status information to the user if a call is terminated by the user before any of the said predetermined time periods have expired. Thus the user may make a call to the device, immediately hang-up and then receive status information e.g. by text message.

The mobile station may be a conventional mobile phone programmed (e.g. with standard software) to enable one of its standard inputs/outputs or interfaces to control an external device. Said inputs/outputs may be electrical inputs/outputs (e.g. ones usually used for a headset) or a wireless interface (e.g. Bluetooth® or infra-red).

The invention also provides a mobile station programmed to enable said inputs/outputs to be used in the remote control of an external device.

Further, the invention provides a program for a mobile station to enable said inputs/outputs to be used in the remote control of an external device. The program may further provide one or more dedicated menus (e.g. a "remote control" menu and/or an "alarm" menu) through which the user may configure the remote control functionality of the mobile station.

BRIEF DESCRIPTION OF THE DRAWINGS

Embodiments of the invention will now be described, by way of example, and with reference to the drawings in which.

DETAILED DESCRIPTION OF PREFERRED EMBODIMENTS

The present embodiments represent the best ways known to the applicant of putting the invention into practice. However they are not the only ways in which this can be achieved.

Embodiment 1

Remote Control with "Delay" Feature to Provide Feedback or Status Information to the User A first embodiment will be described with reference initially to FIGS. 1, 2 and 3. This embodiment provides improvements over the Easygate prior art system for the remote opening of a gate.

This embodiment provides a system for the remote activation of an event, such as the opening or closing of a door, gate, window or shutter. As distinct from the prior art Easygate system, when this present system is used, the user is provided with immediate feedback to confirm the action the system is about to perform, or to advise him as to the status of the system.

Figure 3:
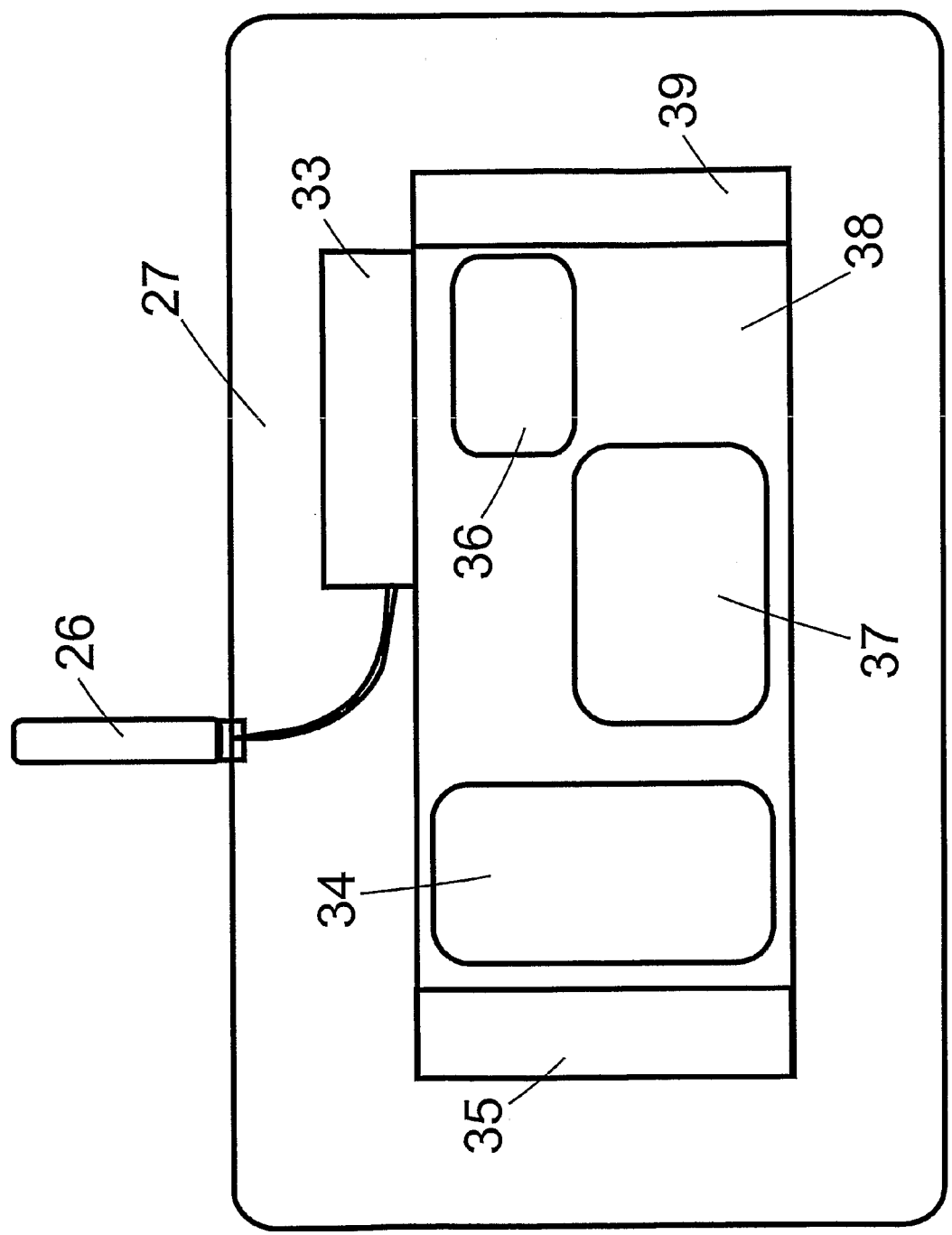
FIG. 3 illustrates an example of internal components of a remote control device.

As shown in FIG. 3, a remote control unit 27 comprises an aerial or antenna 26 connected to a telecommunications transceiver 33. The antenna 26 may be inside the casing of the remote control unit 27, or outside it. In the currently preferred embodiment, the telecommunications transceiver 33 is a GSM transceiver and the aerial 26 is a corresponding antenna for receiving and transmitting mobile telephone communications via a telephone network. However, it should be emphasised that communications protocols or communication standards other than GSM may alternatively be used, and the present disclosure is intended to apply to other existing network types, and those which have yet to be invented or developed.

In the present embodiment, the telecommunications transceiver 33 is provided with a SIM card, thereby providing the remote control unit 27 with a telephone number which a user may call from a remote phone (which may be mobile or land-based).

The telecommunications transceiver 33 is connected to a printed circuit board 38, on which is connected a processor 36, which may be a microprocessor or microcontroller, an integrated circuit, or some other form of processing means. A power supply 37 may also be connected to the circuit board 38. The power supply is connected to a power input/output 35, with which the device 27 may be connected to an electrical mains supply.

Also on the circuit board 38 are one or more outputs 34, which may be relays, inputs to "local" remote control devices, transistors or some other kind of electronic switches or controllable terminals (which may provide a simple on/off functionality, or which may provide a variable voltage or current). Each output 34 is under the control of the processor 36, and is connected to an external device that is to be remotely controlled. Thus, by the processor 36 activating an output 34, an external device such as a drive motor may be turned on or off, and its direction of operation may be reversed, in order to open or close a door, gate, shutter or the like.

A mobile phone or other mobile station could completely replace antenna 26, transceiver 33, processor 36, inputs 39, and optionally part of the power supply 37 and the output 34. Thus, some of the more expensive parts of such a system could be replaced by a cheap mobile phone.

The remote control unit 27 would typically be situated near the gate or door to be opened, with the output 34 connected to the door opening equipment.

The circuit board 38 may also have one or more inputs 39 for connection to "local" remote control outputs, or to local switches or sensors—for example to provide feedback to the remote control unit if the gate is blocked, etc. For example, as shown in FIG. 2, the remote control unit 27 may be connected to a key switch 28 (for local user control of the gate) and a light sensor 29, both of which serve as input devices to the remote control unit 27.

In use, the remote control unit 27 is connected to a mains power supply 25 and the output 34 is connected to the external device to be controlled, such as a drive motor 24 for opening or closing an industrial shutter, for example. Other external devices such as a light 23 or an audible sounder may also be connected to the output(s) 34, to also be remotely operated.

When the remote control unit 27 is turned on, the transceiver 33 performs an initialisation routine to establish communication with the telecommunications network 22. Thus, the transceiver 33 is then able to receive a connection request from a remote phone (e.g. 21a) via the network when the user of the remote phone 21a dials the telephone number of the transceiver 33.

Figure 1:
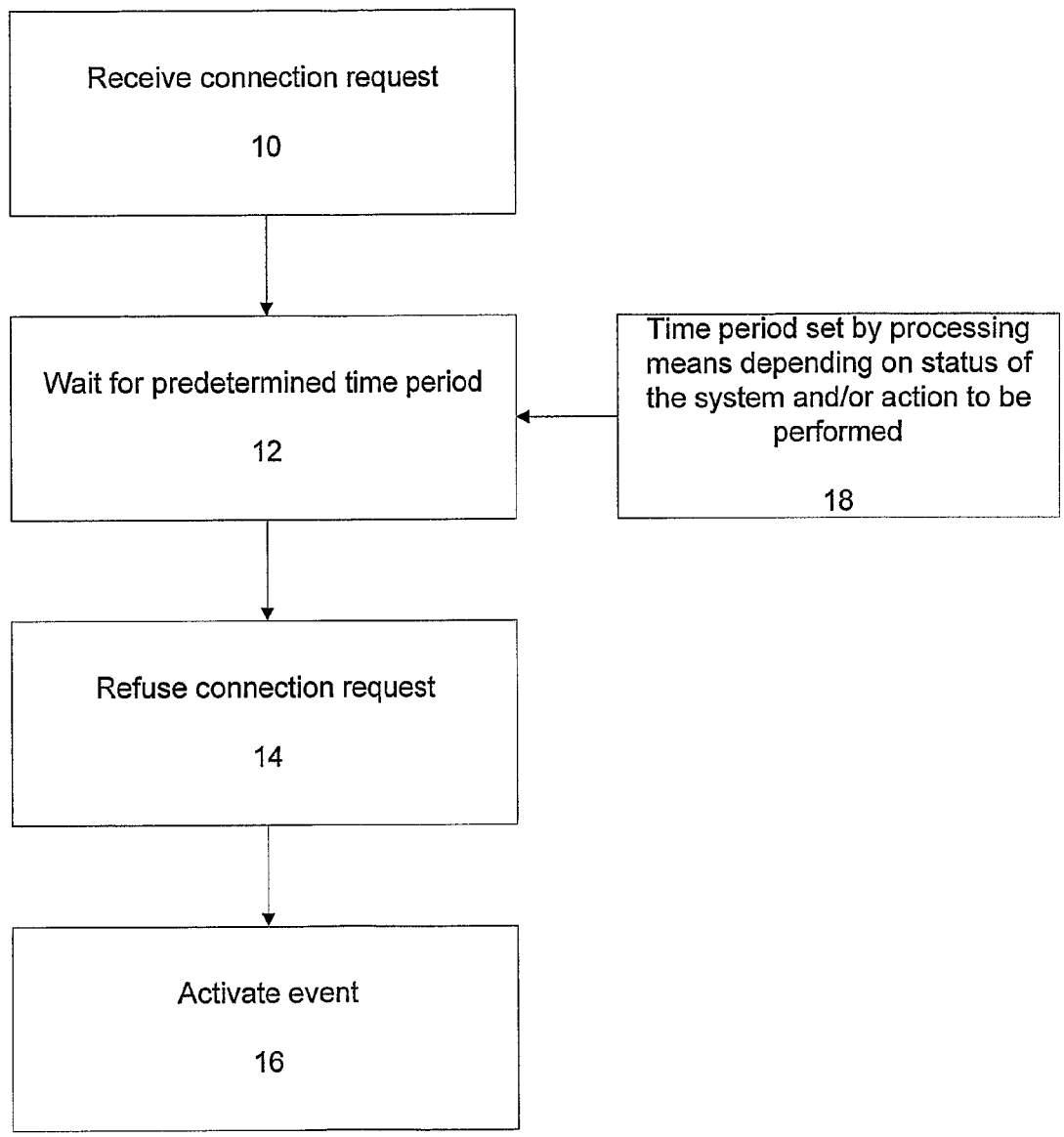
FIG. 1 shows a simplified flow diagram illustrating principal processing steps (including delaying the refusal of an incoming connection request) performed in a remote control system in accordance with the an aspect of the invention.
Figure 2:
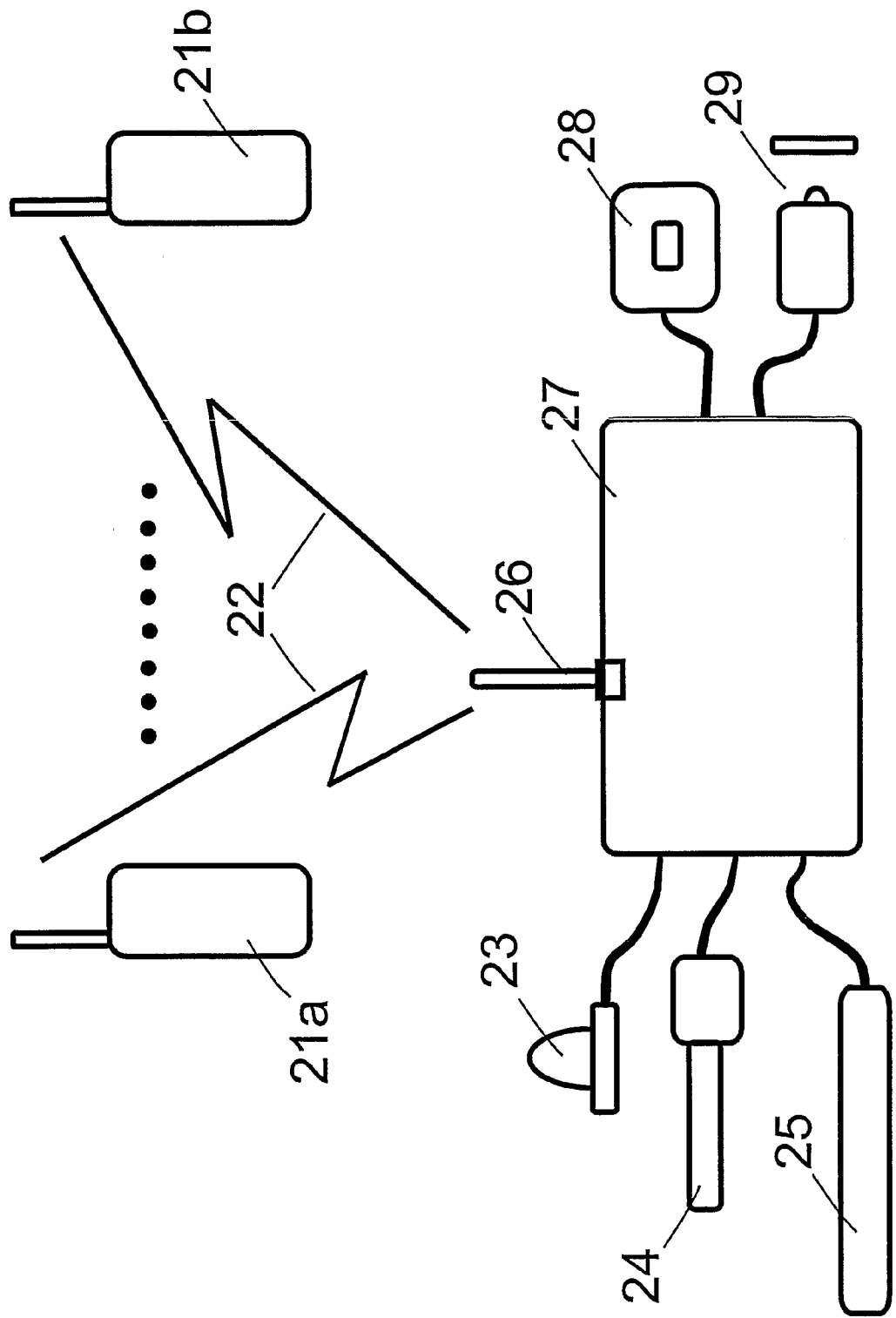
FIG. 2 illustrates a remote control device in communication with a telecommunications network.

With reference to FIG. 1, on receiving an incoming connection request (10), the transceiver 33 does not answer the user's call. Advantageously, this means that the user is not charged for using this service. Instead the system waits (12) for a predetermined time period, before refusing (14) the connection request and then activating (16) the event. (Alternatively the event may be activated and then the connection request refused.) From the user's point of view, on dialling the phone number of the transceiver 33, the user hears a predetermined duration of ring tones, and then the call is rejected and the user hears nothing (i.e. no more ring tones) or alternatively a signal or message (or receives other information) provided by the network provider when a call is rejected.

The step 12 of waiting for a predetermined time period (or alternatively a predetermined number of "RING" messages provided by means of AT-Commands of a GSM-module) before refusing the connection request is considered to be an important distinction over the prior art Easygate system. The duration of the "wait" period, i.e. the duration of ring tones the user hears before the system refuses the incoming connection request, can be used to convey important information to the user as to what state the system is in, and what it is about to do.

The duration of the "wait" period is determined (18) by the processor according to the status of the system and/or the action to be performed. For example, the processor may set the "wait" period to be long (e.g. 6 seconds, or 6 "RING" messages provided by means of AT-Commands of a GSM-module) if the door is closed and is now about to be opened, or conversely may set the "wait" period to be short (e.g. 2 seconds, or 2 "RING" messages) if the door is open and is now about to be closed. Thus, the user hearing a long duration of ring tones is informed that the door is closed and is now about to be opened, whereas a short duration of ring tones (or even no ring tone at all) indicates the door is open and is now about to be closed. This provides the user with immediate confirmatory feedback as to the status of the system and the action to be performed. Through being immediate, this confirmatory feedback is highly preferable over other possible ways of sending feedback to the user. For example, such a system could send the user a text message, or phone him back to play a pre-recorded audio message. However, such forms of feedback would incur telecommunications charges and would not be immediate. Indeed, a confirmatory text message could take several minutes to be sent, depending on when the telecommunications company actually sends it, the capability of the network to convey it quickly, etc.

With the present embodiment, the incoming connection request is refused after the "wait" period, and this means that the user is provided with a service (i.e. the opening of the door or gate) and obtains immediate confirmatory feedback (by way of the duration of the ring tones heard before the connection request is refused), without incurring a connection charge (in the many countries whose telecommunications networks do not charge for refused calls).

Another advantage of the direct feedback is that the user can be sure that he dialled the right number.

A further advantage provided by the "wait" period, before the incoming connection request is refused, is that the user is provided with an opportunity to cause the remotely controlled event to be cancelled or aborted. This may be achieved by the user terminating the connection request during the "wait" period, for example by pressing the cancel button on a mobile phone, or replacing a conventional land-based telephone handset on its transceiver. If the remote control unit detects that the incoming connection request has been cancelled before the end of the "wait" period, then the processor will not activate the remotely controlled event.

In some cases, on hearing the duration of ring tones which convey a certain system status to the user, the user may realise that the remotely controlled action that he thought he was instructing is not actually the action that is about to be performed, and consequently he may abort the forthcoming action by terminating the connection request before the end of the "wait" period.

Together with the processor 36, a memory may also be provided to store the status of the system. If the remote control system is being used to control a multi-state operation (such as the opening or closing of a door, which can have two states—i.e. either opened or closed), then the memory may also record the last state that the system was in (e.g. the door being closed). This information may then be used by the processor to adjust the duration of the "wait" period accordingly, to convey this status information to the user as described above.

A sensor, such as a photocell 29, may be provided in the vicinity of the article that is to be remotely controlled, and arranged in order to provide an error signal to the remote control device 27, for example in the event of a blockage that would prevent a gate from closing. If, prior to receiving an incoming connection request, the processor 36 receives input from a photocell 29 or other sensor representative of an error or incident in the vicinity of the gate, then the system will not activate the mechanism for opening or closing the gate. In such instances, the processor 36 will set the duration of the "wait" period to a duration different from those used to indicate that the gate is being opened or closed. Thus, when a user phones the system and there is a blockage or some other problem that is preventing the system from performing the desired action, he will hear a third duration (or number) of ring tones (e.g. for 12 seconds, or 12 ring tones) to advise him that there is a problem.

If, however, the photocell 29 or other sensor is activated during the remotely controlled event, i.e. after the incoming connection request has been refused, then the remote control unit will abort the event if possible (e.g. by stopping or reversing the gate drive motor) and will notify the user via the network. This notification could take the form of an automatically generated audible message (i.e. the user is effectively called back by the system), or may be a text message. Alternatively, the system may call the user's mobile phone number, such that the user sees the phone number of the system or a corresponding name (e.g. "PHOTOCELL ALARM") on the display of his mobile phone. The user can then reject this incoming call from the system (so that this service is also free from telecommunication charges), and can then call the system back in order to reset the alarm. This return call from the user, that will also be rejected by the system, will have the effect of not only resetting the alarm, but also closing the door or completing the aborted action (provided that the problem or blockage has now passed and that the photocell or other sensor is now deactivated). If the photocell is still active, then the user will be provided with this information by way of the third duration of ring tones described above, prior to the system refusing the connection request of his return call.

The course of events described above in connection with a photocell could similarly be used in connection with any other sensor. Thus the present system can also be used to send any alarm information, for example from a burglar alarm, etc.

The system may be configured such that, if the photocell alarm is not reset, the system will continue trying to call the user (for example every five minutes). Alternatively it may call one or more other users, a security organisation or the police, according to a pre-programmed sequence or hierarchy of telephone numbers that are to be used in such an event.

For security purposes, the remote control system may be configured such that it only responds to incoming connection requests from certain phone numbers. The processor 36 may be configured to identify the telephone number from which the connection request originated, to compare this telephone number with a list of authorised telephone numbers, and only to activate the remote control event if the said telephone number is on the said list. A user interface may be provided on or within the control unit 27, to enable a user to add or remove telephone numbers from this authorised list. Alternatively, the system can be configured to respond to a connected computer, or to text messages, to enable authorised numbers to be added to the list or removed from the list.

In the presently preferred embodiment, a list of authorised numbers can also be programmed without using a computer or text messages, but instead by using a single setup button provided in or on the control unit 27, as follows:

On delivery, the remote control device 27 may be used without any preconfiguration, and connection requests from any phone will be accepted. Even phones that do not transmit their number, or somehow suppress it, can be used to operate the system. In such cases, the system still retains a certain degree of security, since the user is required to know the phone number of the transceiver 33 in order to be able to use the remote control system.

However, if it is desired that only certain phone numbers should be authorised to activate the remote control system, then all a user needs to do is to press the setup button as indicated in the following programming steps:

1. Connect the power. The system accepts all phone numbers.
2. Make a call from an "authorised" phone (phone "A") to the system. Press the set up button. The system will only accept calls from this "authorised" phone A.
3. Make another call from a hitherto unauthorised phone (phone "B"). The system will not respond. However, pressing the setup button will then cause the system to accept calls from both phones A and B. This process may be continued to add further phone numbers to the list of authorised numbers.

Storing numbers in this manner has an additional advantage, in that it is not possible to mis-enter a telephone number by human error. If a computer or text message were used to program a number onto the authorised list, then it is possible that the programmer may mis-type the number. However, with the present method as described above, there is no scope for a wrong number to be entered.

To erase all the stored numbers, the setup button may simply be pressed and held down for a predetermined length of time, e.g. a few seconds.

The system can be factory set with the following safety function. The first telephone number stored (by pressing the setup button) will not only be designated as being an "authorised" number, but will also be designated as being the "priority" number. Thereafter, all alarm messages and details of any subsequently stored numbers will always be sent as text messages to this priority number. Resetting the system by holding down the setup button will delete all the numbers except this priority number. To reset the number to the factory setting a user would need to enter a code number, or press some other global reset button (which may be concealed in order to prevent accidental use).

When existing local (e.g. infra red or radio frequency) remote control units are used, for example to open a gate, one cannot tell which of a number of identical transmitter was used, because all equivalent local transmitters send the same information to the transceiver. However, with the present system a log may be kept of the telephone numbers of the phones used to activate the remote operation, together with details of the operation that was performed (e.g. whether a gate was opened or closed), and also the time and date of the operation may be recorded as well. Thus, a log of the remotely-controlled events may be produced, for subsequent analysis by security personnel if necessary.

Further, it is possible to arrange more than one photocell, for example one inside a garage and one outside, so that it is also possible to record in the log whether a vehicle drove into the garage or out of it. This could be useful for applications in restricted areas such as industrial sites.

With this system it is straightforward to keep a record of how often a door, gate or shutter is opened or closed, how many times it has been opened or closed, and how many hours a drive motor has been operated. This information may be stored and read out any time, but using a mobile phone system this information can also be sent automatically (e.g. as a text message) to the company that installed the system, and/or to the owner of the premises.

For example, a text message could be sent to a shutter installation company to say: "Customer XYZ in London, address . . . , phone number . . . , has opened/closed his shutter 1000 times and so it is now due for a service."

This provides an advantage for the owner of the shutter, in that he can be assured that the shutter will be serviced at appropriate times during its life.

Procedural Flow Diagrams to Illustrate an Example System According to Embodiment 1

The procedural flow diagrams shown in FIGS. 9, 10, 11 and 12 illustrate the processing and communication steps performed by an example of a network-based remote control system—here being used to remotely control a gate.

Main Program (FIGS. 9a-d)

Figure 9A:
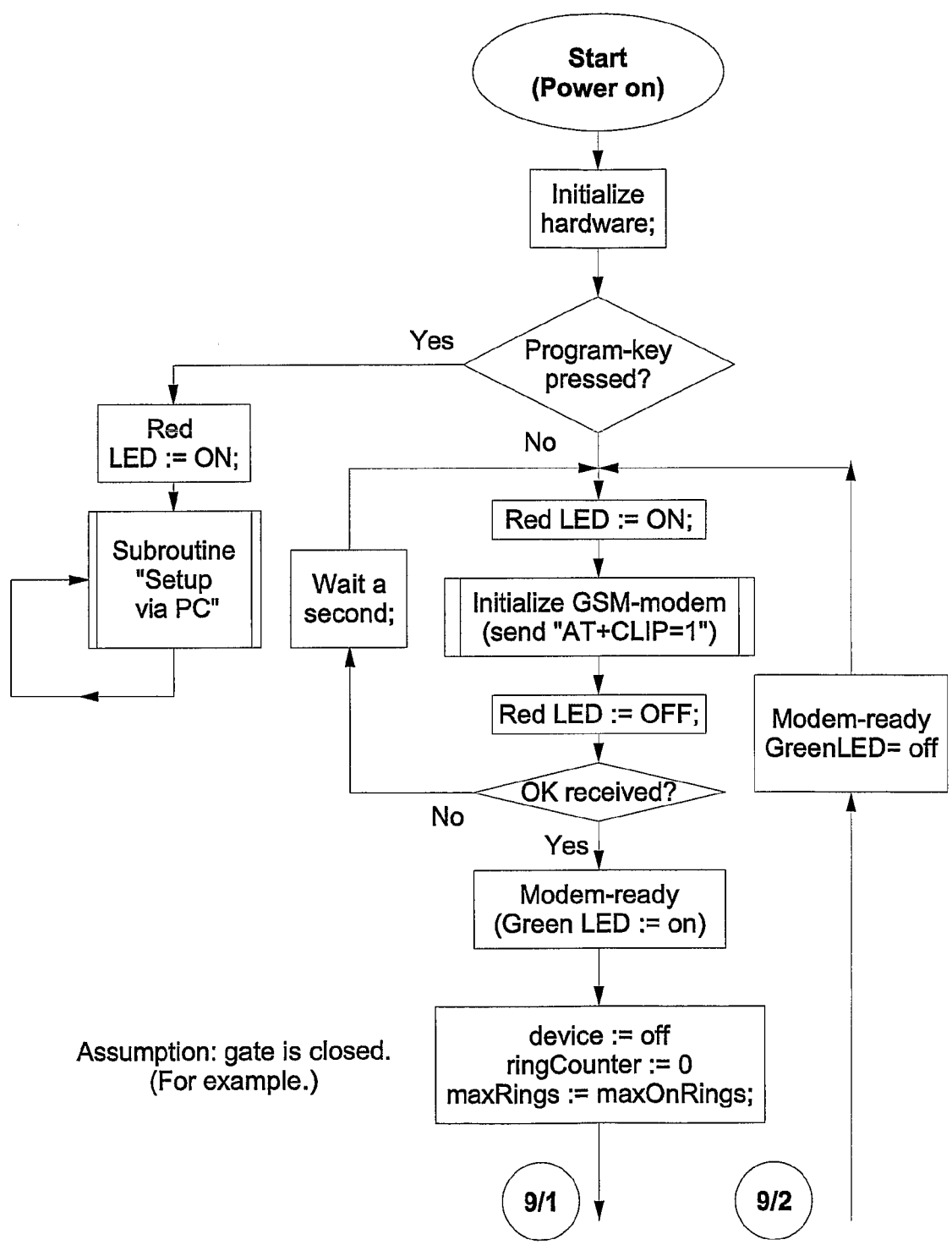
FIG. 9 is a procedural flow diagram (to be formed by joining partial flow diagrams 9a, 9b, 9c and 9d according to the off-page links 9/1, 9/2, 9/3, 9/4 and 9/5) illustrating the steps performed by a processor in an example of a remote control device.
Figure 9B:
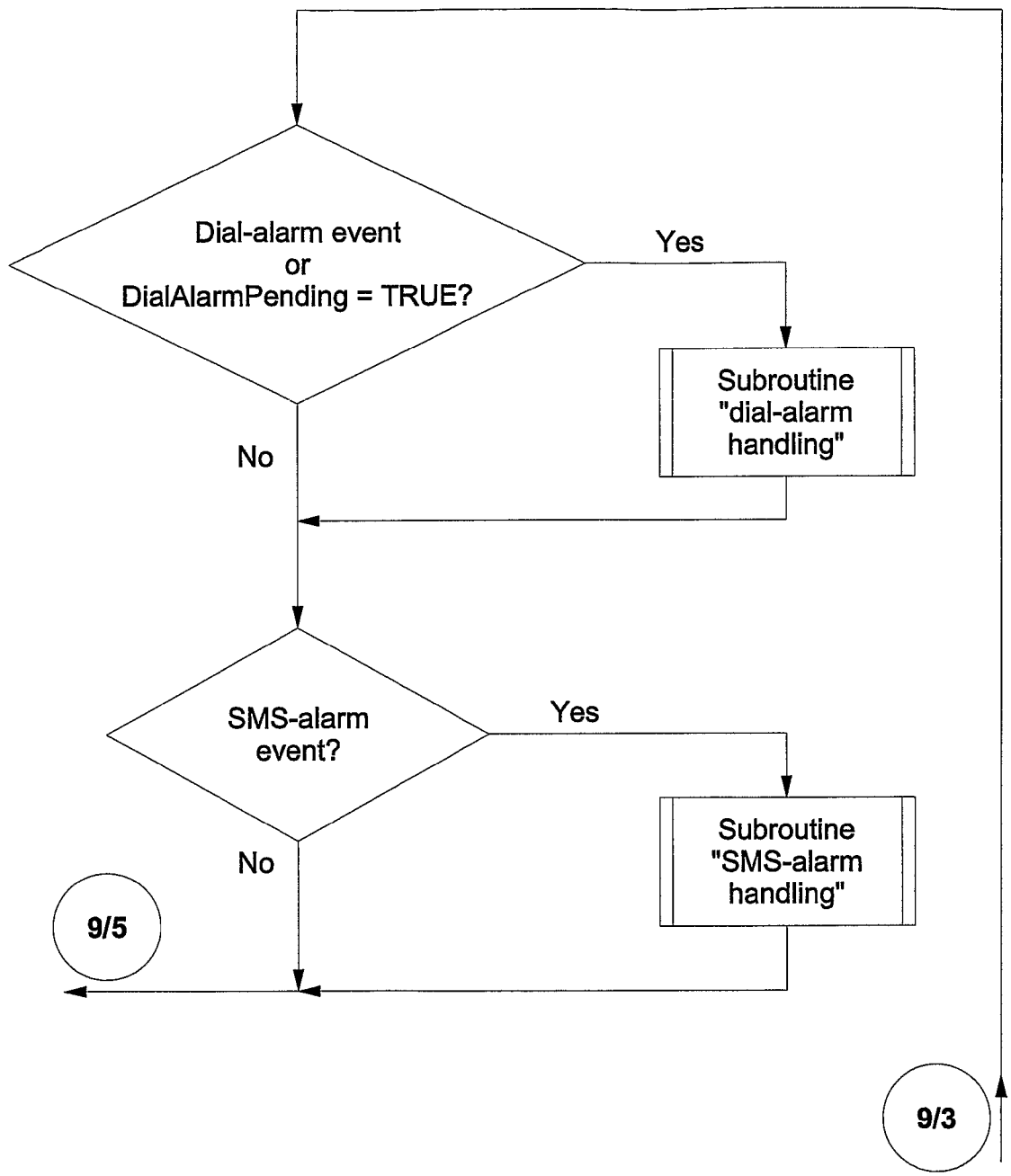
Figure 9C:
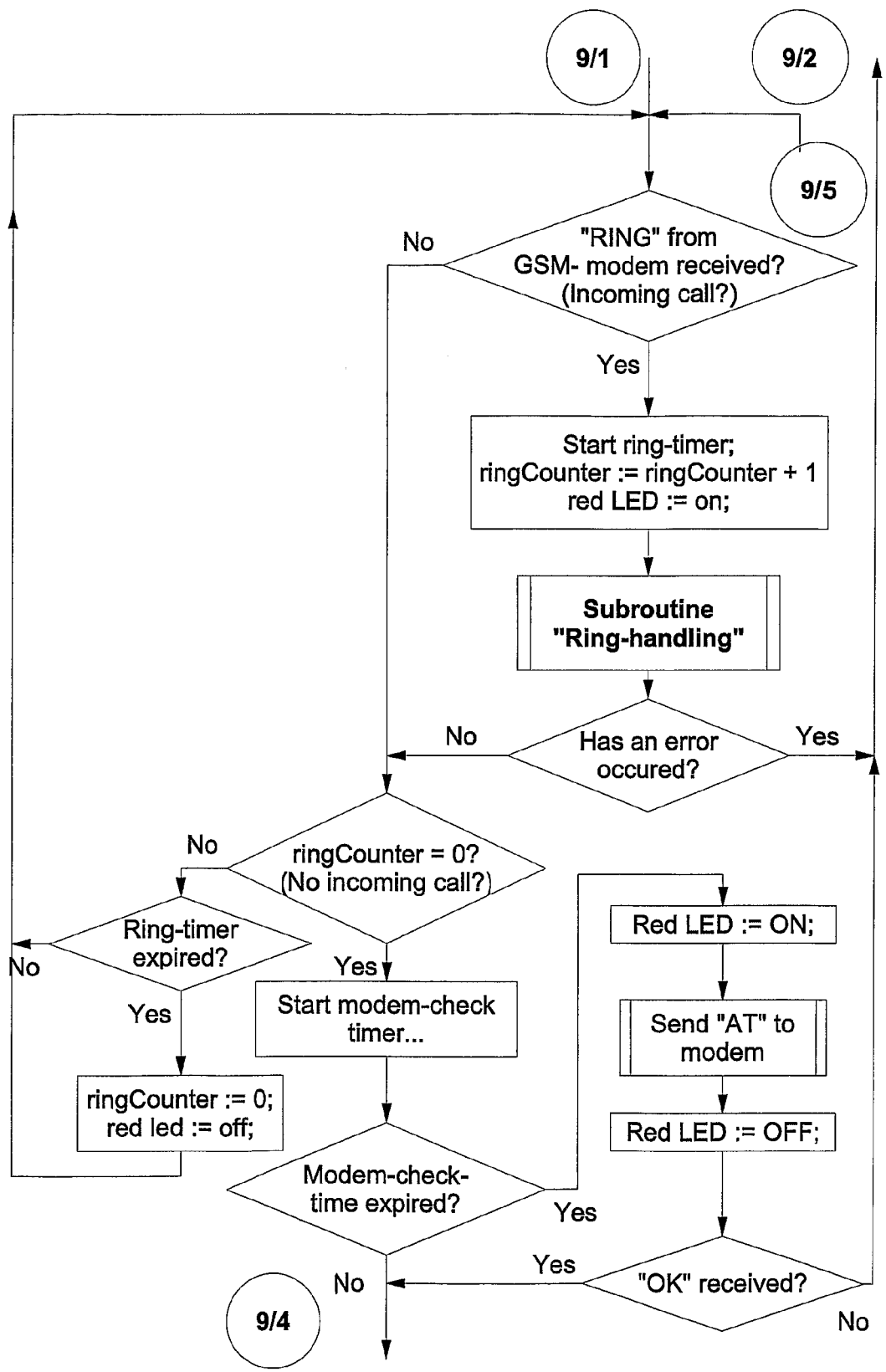

The flow diagram in FIG. 9 begins with the power being turned on and the hardware initialised (FIG. 9a). The system then checks whether the program key is being pressed on the user interface. If it is pressed, a red LED is illuminated and the system executes a subroutine "Setup via PC", which enables the details of authorised users to be supplied from a PC, together with other setup parameters.

If the program key is not being pressed, the red LED is illuminated and the GSM modem is initialised on the network, sending a message AT+CLIP=1 (CLIP: Calling Line Identification Presentation, i.e. the calling number will be given in addition to the "RING" message). The red LED is then turned off. Once an OK signal is received, the modem-ready LED is turned on.

The door status is now set to "off" and the next accepted incoming call will open the door. The system waits at this stage (see FIG. 9c, connected to FIG. 9a via link 9/1) for an incoming call, or any other input signal. If the system is called, the GSM-module will send a "RING" message and the phone number to the controller. By this the controller knows that the system has been called and turns on the red LED. The number of received "RING" messages is counted by a ring counter which is incremented after every received "RING" message until the set maximum count is detected by subroutine "Ring-handling". If the ring counter is not zero, this indicates that the system is actually receiving a call. If no further "RING" message is received after a predefined time the system assumes that the caller hung up, the counter is reset to zero and the red LED is turned off.

The counting of the "RING" messages received is a key element of the system, in order to provide the delay before the incoming call is rejected. The interpretation of the received "RING" messages is done in subroutine "Ring-handling".

To make sure that the GSM-transceiver remains connected to the network, the controller will constantly send command "AT" to the GSM-module and check if the module sends back an "OK" message. If no "OK" is received the system turns off the green LED to indicate the lost connection and waits until an "OK" is received again.

Figure 9D:
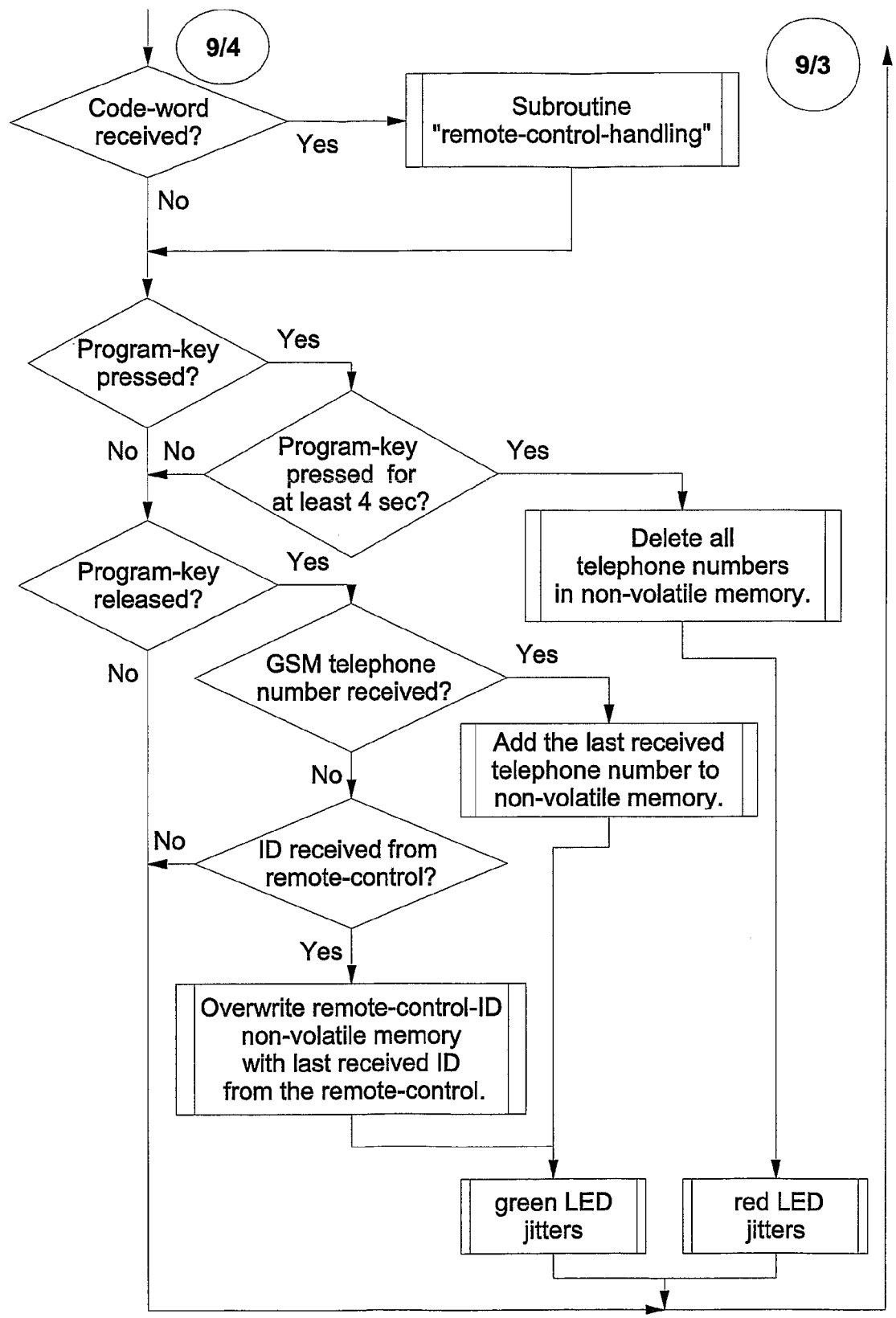

With reference to FIG. 9d, in addition to the GSM-transceiver the system may contain a local remote control receiver. The program waits for code-words received by this receiver. If a code-word is received the interpretation will be done in subroutine "remote-control-handling".

If the "program-key" button is pressed the following program steps deal with adding received phone numbers or code-words to the list of authorised users in the non-volatile memory. This is done by simply pressing the "program-key" button for a short period of time. Pressing this button for more than 4 seconds will erase all stored phone numbers.

If the button is not pressed the program (via link 9/3) checks if any alarm input was triggered and jumps to the subroutines dealing with these alarms and/or continues waiting on incoming calls (via link 9/5).

Figure 10A:
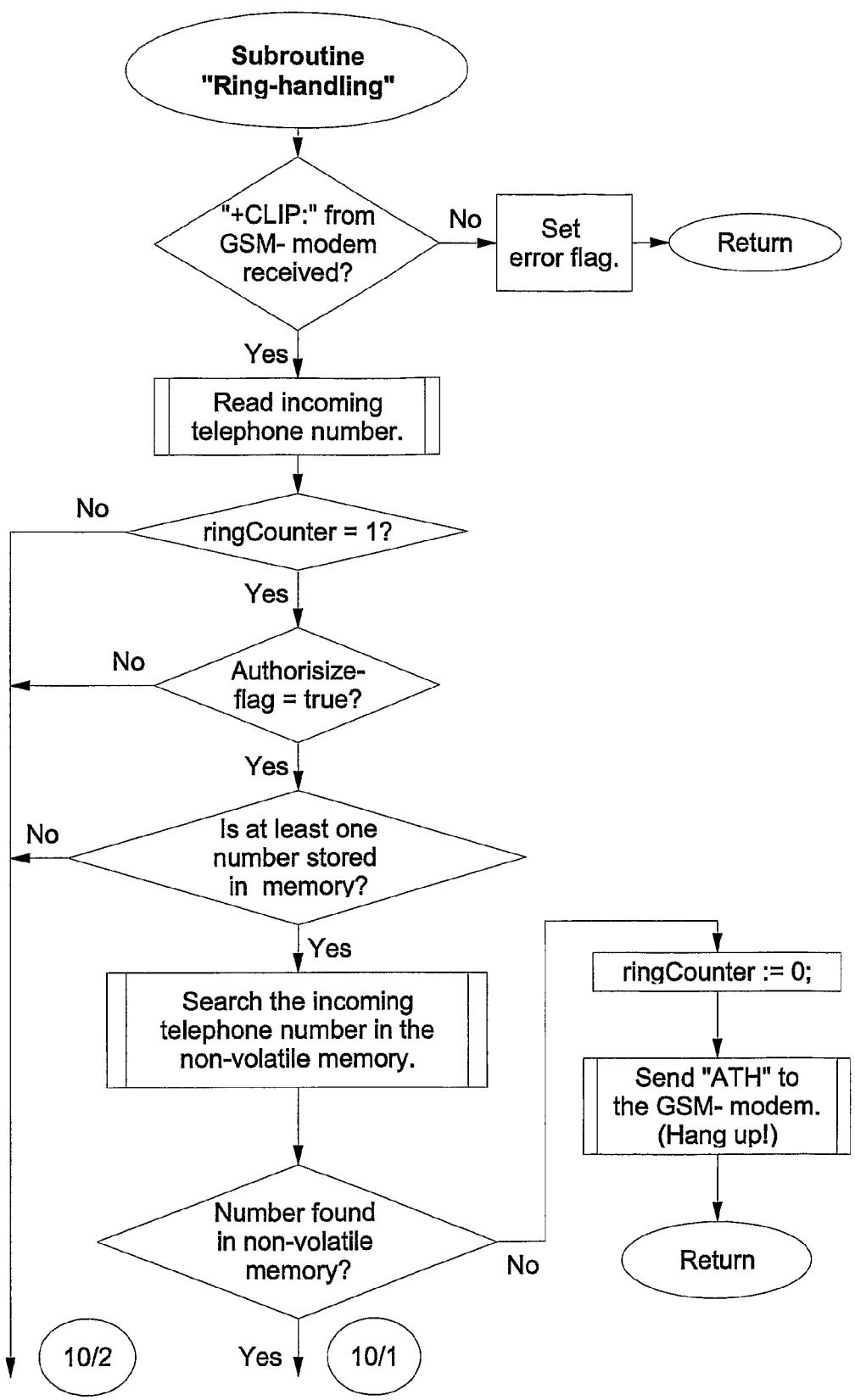
FIG. 10 is a procedural flow diagram (to be formed by joining partial flow diagrams 10a, 10b and 10c according to the off-page links 10/1, 10/2 and 10/3) illustrating the subroutine "Ring-handling" from FIG. 9.
Figure 10B:
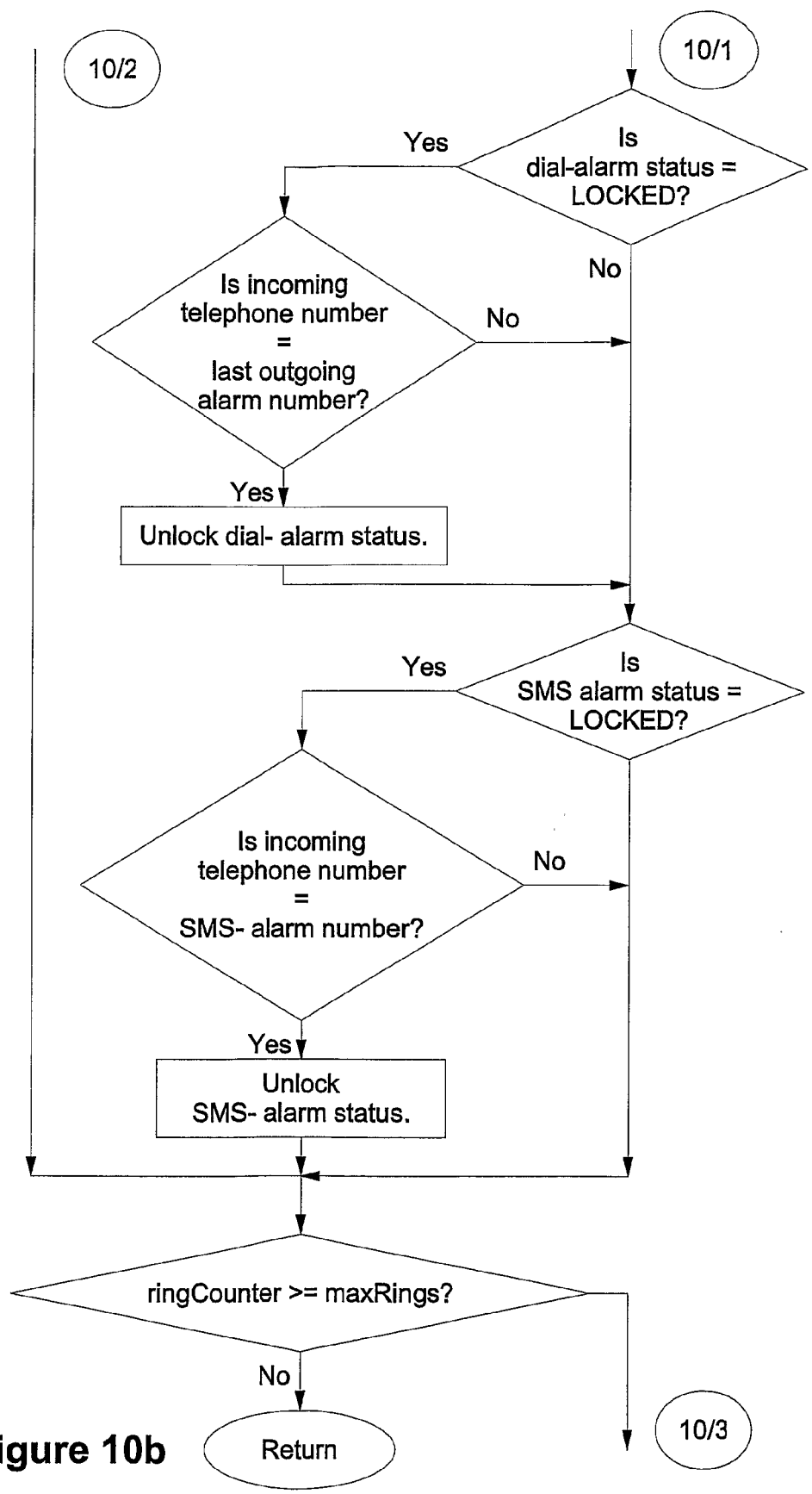
Figure 10C:
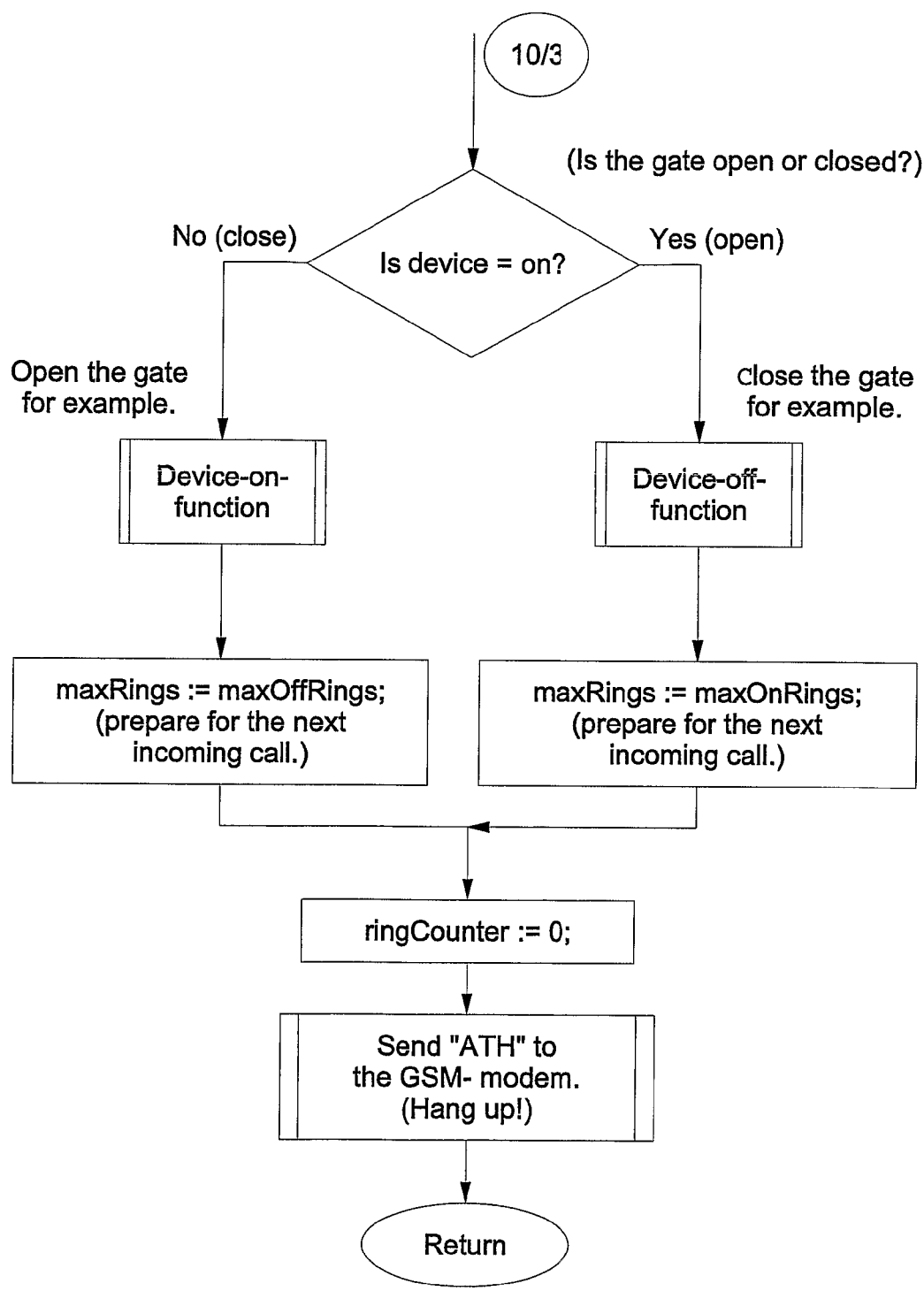

Subroutine "Ring-Handling" (FIGS. 10a-c)

After having received the first "RING" message from the GSM-module (FIG. 9c), the program jumps to subroutine "Ring-handling" (FIG. 10a) and checks if a message containing "CLIP" has been received. The "CLIP" message will be followed by the calling number in most cases but as the system might be operated by phones suppressing their number (CLIR: Calling Line Identification Restriction) this is of no importance at this stage. If no "CLIP" is detected, the program will set an error flag and exit the subroutine.

The program continues by reading the incoming phone number and then checks if the ring counter is set to 1. If not it will check (FIG. 10b, via link 10/2) if the maximum number of "RING" messages has been reached and, if the maximum number has been reached, will exit the subroutine.

After detecting that the ring counter is set to 1 the program checks if the system is set (e.g. by subroutine "Setup via PC" (FIG. 9a)) to accept authorised users only (i.e. only phones which give their number and for which their number is authorised). If only authorised users are allowed, there must be at least one number stored in the non-volatile memory of the system or on the SIM-card. The program searches for the number calling and will hang up (by sending command "ATH" to the GSM-module) if the number is not "on the list" (i.e. stored in memory) and will exit the subroutine.

If the number is on the list the program checks if an input signal triggered the "dial-alarm" beforehand—causing the system to call a phone number—and setting the dial-alarm status flag. If this flag is not set, the program will continue checking the SMS alarm status flag, which will have been set if a text message had been sent by the system. If this flag is not set to "LOCKED", the program will check if the maximum number of "RING" messages has been received—exiting the subroutine in this case and continuing with the program sequence if not (see FIG. 10c via link 10/3). If any of these two flags is set to "LOCKED", the program compares the calling number with the number the dial-alarm or SMS-alarm was sent to. If the numbers are the same the alarm status flags will be unlocked (reset).

If the maximum number of "RING" messages has not been reached, the program flow continues and checks the actual status of the system to be operated, i.e. checks if the gate is closed or open (see FIG. 10c via link 10/3). A closed gate will be opened, a opened gate will be closed. Thus, the "feedback information" for the next incoming call is set up by setting the number of "RING" messages the program will wait next time before the appropriate action is executed (i.e. before the gate is opened or closed). After this the ring counter is reset, the connection request is rejected by sending hang-up command "ATH" to the GSM-module, and the program exits the subroutine.

Figure 11A:
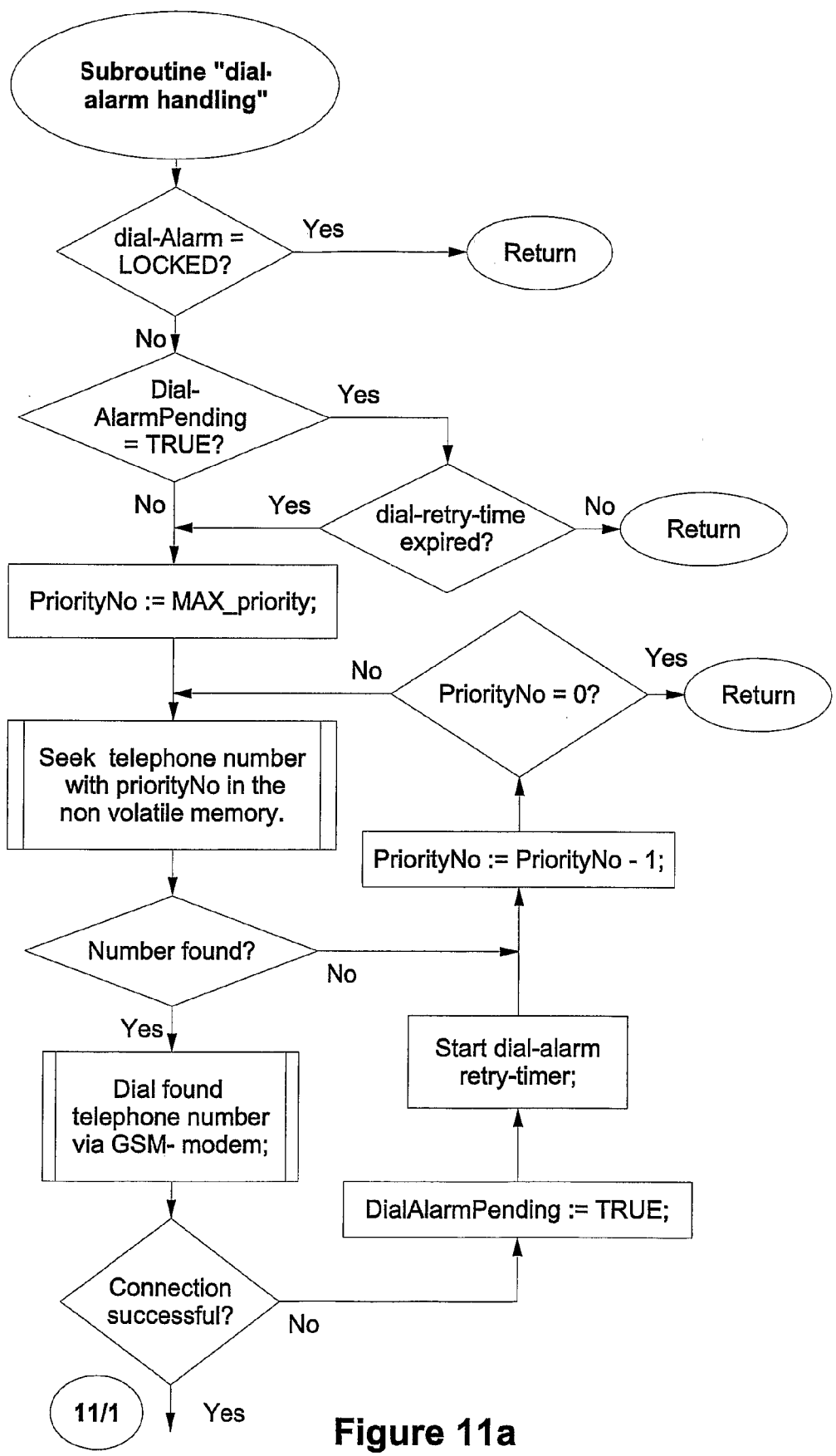
FIG. 11 is a procedural flow diagram (to be formed by joining partial flow diagrams 11a and 11b according to the off-page links 11/1) illustrating the subroutine "Dial-alarm-handling" from FIG. 9.
Figure 11B:
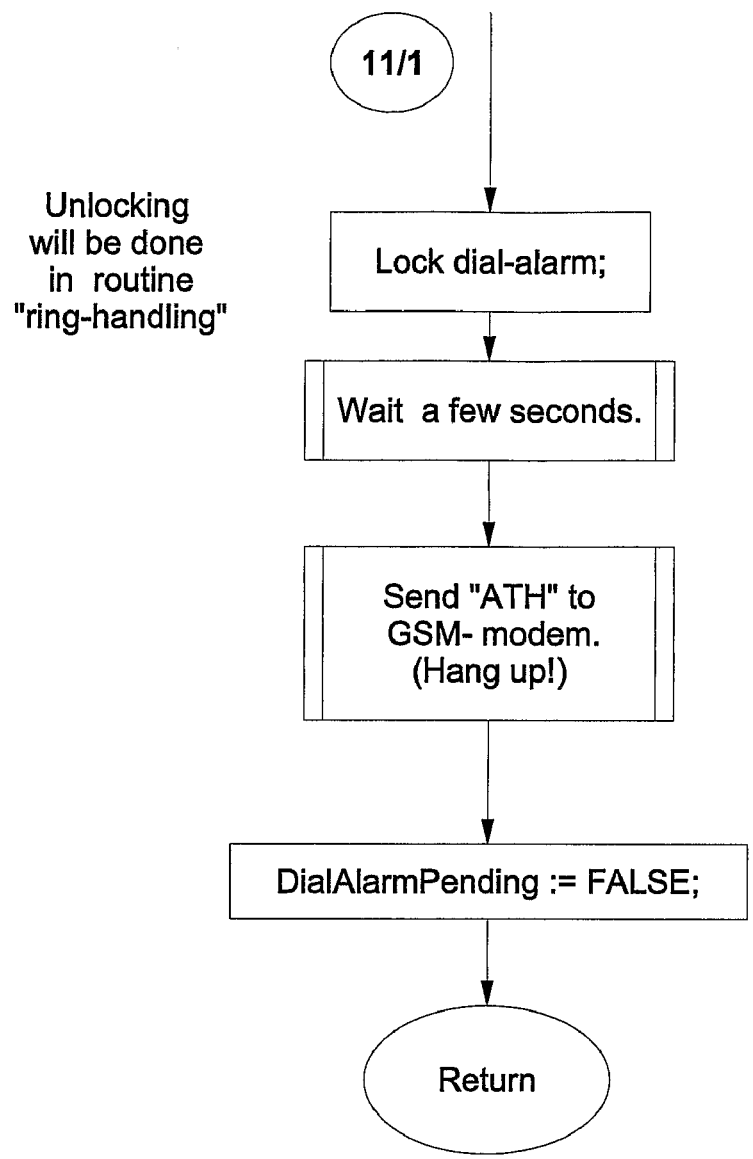

Subroutine "Dial-Alarm Handling" (FIGS. 11*a-b*)

If the program is triggered by a "dial-alarm" input signal this subroutine will be executed. The first check is done to make sure that the dial-alarm flag is not set (LOCKED), otherwise the program will instantly exit the subroutine.

If a dial-alarm has to be executed, the program will seek the phone number with the highest priority stored. (Note that adding a priority number to a phone number may be done by subroutine "Setup via PC" (FIG. 9*a*) or e.g. by automatically assigning the highest priority to the number stored first, etc.). After this number is found, it will be dialled by sending the appropriate AT-command and the phone number to the GSM-module. The program then waits for a feedback from the network provider to see if the connection had been successfully established. If so, the program will lock the dial-alarm (FIG. 11*b*, via link 11/1), wait a few seconds and hang up. Before exiting the subroutine, the program will reset the "DialAlarm Pending" flag.

If the connection request was not successful (FIG. 11*a*), the "DialAlarmPending" flag will be set and the whole process previously described will be executed with the phone number having the next highest priority. If all priority phone numbers have been called without a successful connection the program will return. Because the DialAlarmPending flag is still active the program will wait (the next time it enters this subroutine) for a set dial-retry time and will start the whole process again and again until a successful connection can be established.

Figure 12:
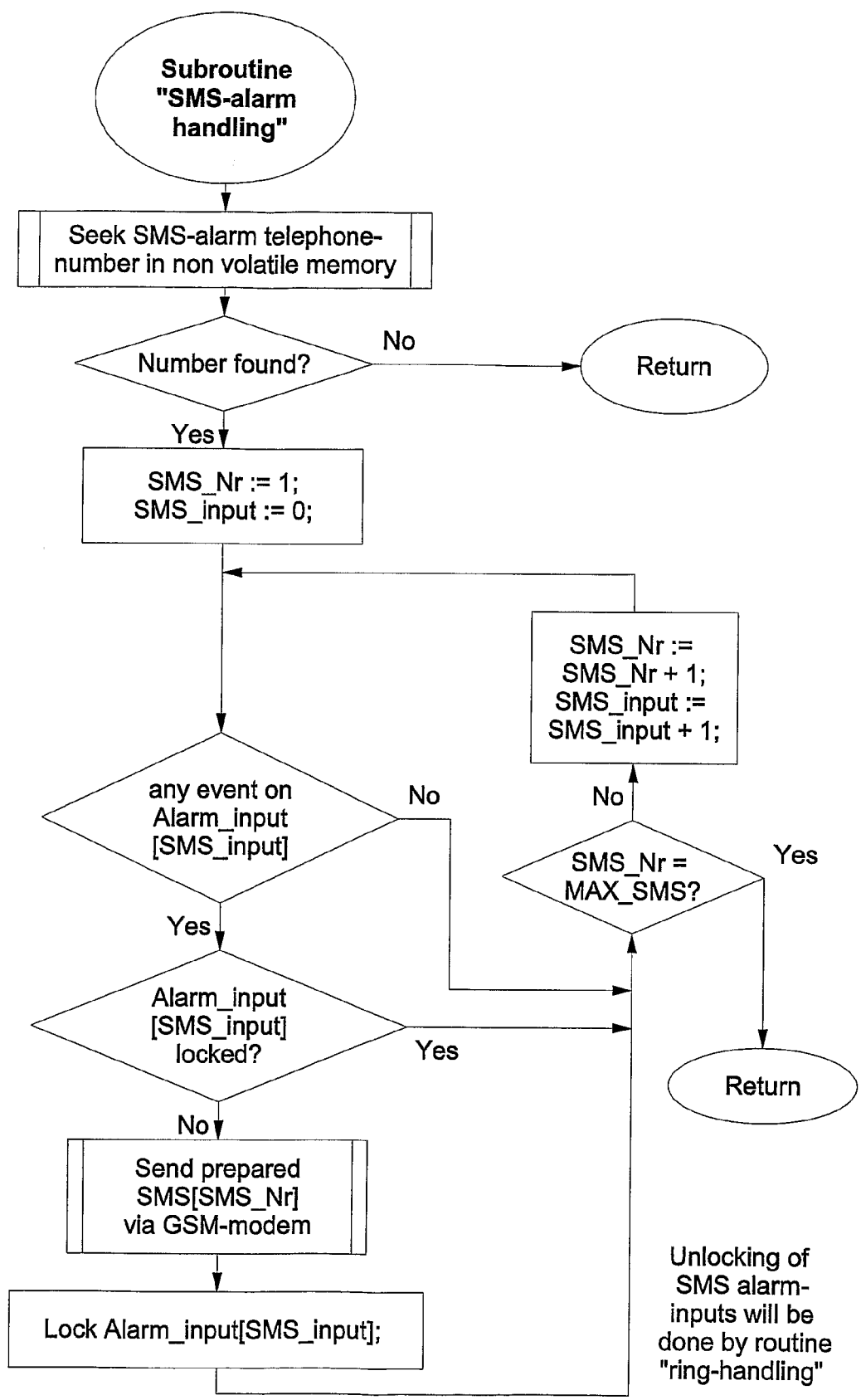
FIG. 12 is a procedural flow diagram illustrating the subroutine "SMS-alarm-handling" from FIG. 9.

Subroutine "SMS-Alarm Handling" (FIG. 12)

This subroutine handles the sending of four different text messages (SMS1-4) (stored in the system e.g. by subroutine "Setup via PC") to a phone number also stored in the system.

If the program is triggered by a "SMS-alarm" input signal (input0-3) this subroutine will be executed. The program checks if there is a number stored to which the SMS can be sent, otherwise the program will instantly exit the subroutine.

If such a number is found, the program will check which of the four SMS inputs was triggered and will send SMS1 if input0 was activated, SMS2 if input 1 was activated, etc.

Whenever a SMS is sent, the "SMS_input" flag will be set to "locked", preventing the system to be retriggered by the same input signal again. The unlocking of this flag is done by subroutine "Ring-handling".

After having reset the flag, the user will get no more text messages if the input signals are no longer active. In case of the inputs still being active, the text messages will be sent again.

Embodiment 2

Remote Control of the Illumination of a Display

The embodiment described above for the remote control of an event may be used to control the illumination of a display. In this embodiment, it should be emphasised that it is not necessary for the remote control unit to provide a delay before rejecting an incoming connection request.

This embodiment was initially conceived to enable a passer-by to cause a shop window display to be illuminated at night, on demand. This provides the benefit that the shop does not need to illuminate the window display continuously throughout the night, when there are no people nearby to see the display. Instead, using this embodiment, a passer-by can cause the shop window light to be illuminated as and when required. This enables the shop to leave the lights turned off, or at a low level, for the rest of the night, thereby saving electricity costs and benefiting the environment.

This embodiment has more applications than simply illuminating a shop window, and is also envisaged to be of use in museums and art galleries in which delicate exhibits are only illuminated as required, in order to avoid exposure to light over a prolonged period of time. This embodiment may also be used to illuminate public landmarks or historical sites, as and when required.

Figure 4:
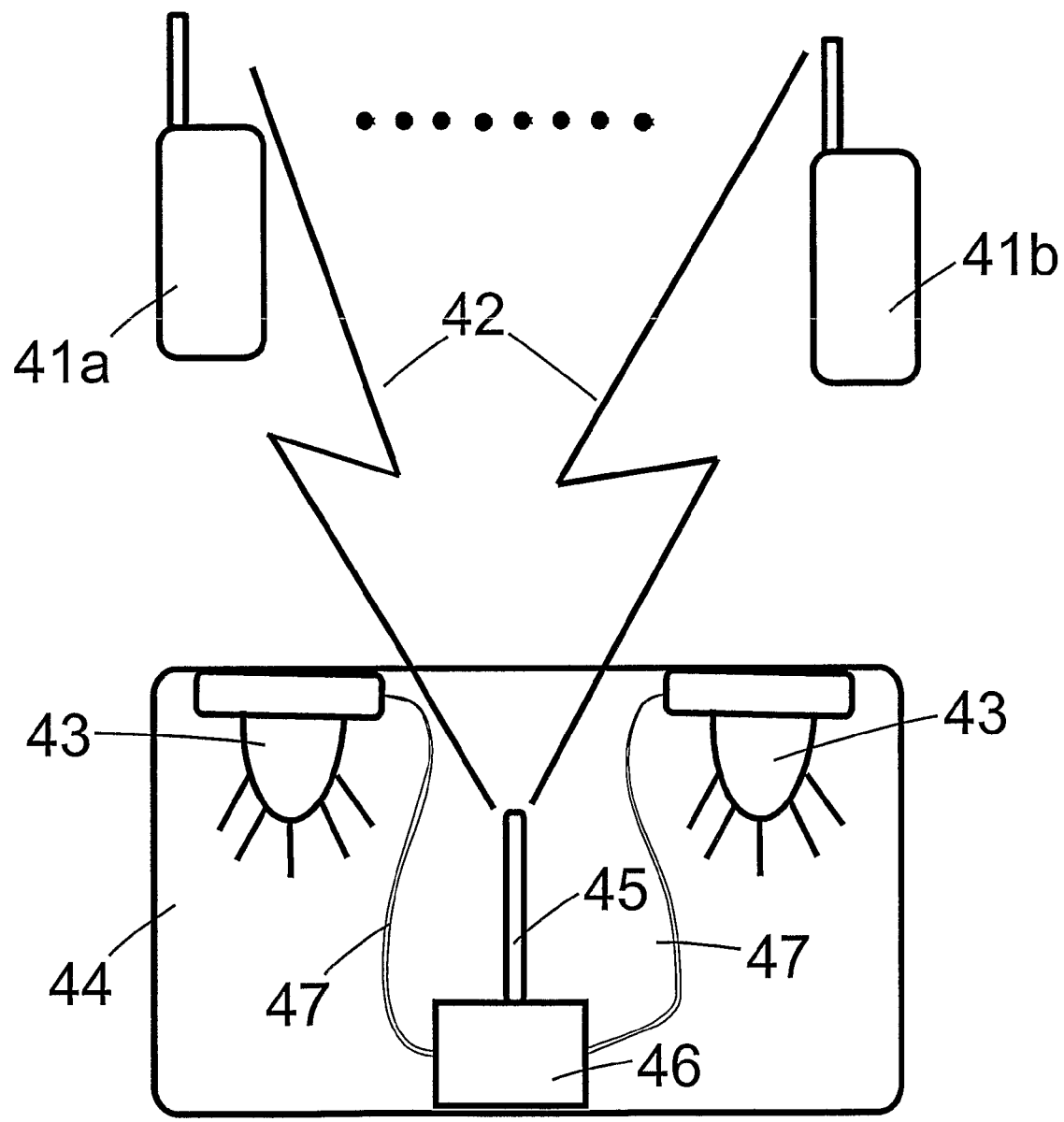
FIG. 4 illustrates a remote control device being used to control the illumination of lights in a shop window.

FIG. 4 illustrates an example of this system used for illuminating a shop window at night. The remote control unit 46, having an antenna 45 and an internal transceiver and processor (as with the unit shown in FIG. 3), is first installed in or near the shop. The control unit 46 is connected by wires 47 or a wireless link to the lights 43 in the shop window 44. The control unit 46 is turned on and is connected to a telecommunications network 42 to enable the control unit 46 to receive an incoming connection request from a phone (e.g. 41*a* or 41*b*) belonging to a passer-by.

The telephone number to be dialled, in order to cause the lights in the shop window to be illuminated, may be displayed outside the shop window, or conveyed to the public through advertising or by some other means. Thus, a person passing the shop window 44 at night, who wishes to view the window display, may dial the advertised phone number, which has the effect of sending a connection request from his mobile phone 41*a* via the network 42 to the remote control unit 46. Upon receiving this connection request, the control unit 46 will then reject the incoming connection request and will cause the shop window lights 43 to be illuminated. The remote control unit 46 may then turn the lights 43 off after a predetermined time period, for example after ten minutes, to save electricity until another passer-by wishes to illuminate the window display.

Instead of refusing the incoming connection request, the remote control unit 46 may answer the connection request, for example by playing a prerecorded acknowledgement or advertising message to the mobile phone user.

Figure 5:
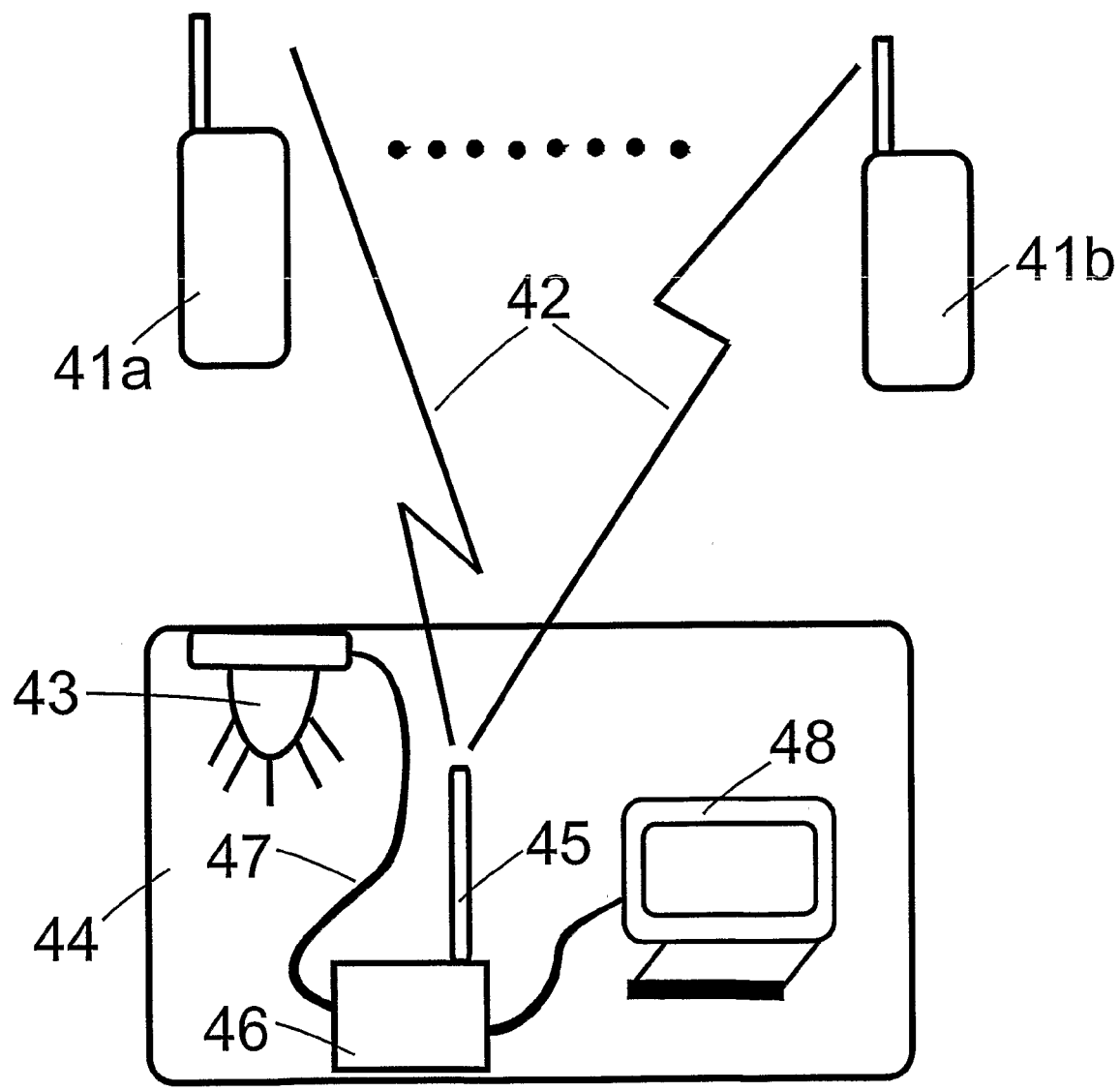
FIG. 5 illustrates a further example of a remote control device being used to control the illumination of lights in a shop window, with the user details being logged on a computer.

To provide an incentive for passers-by to call the remote control number and thereby cause the shop window display to be illuminated, the telephone number from which a connection request originated may be stored in the system or, for example, on a computer 48 as shown in FIG. 5, and the shop or system operator may enter the user's telephone number into a lottery or draw. This gives passers-by who illuminate the shop window an opportunity to win a prize. The system can be programmed to fully automate such a lottery or draw and to automatically inform the winner by giving direct feedback using the above-described "delay" feature (i.e. refusing the incoming connection request from the user's phone after a predetermined time, as described earlier), or by sending a text message (or a pre-recorded audio message) to the known phone number of the winner. Other ways in which passers-by could be rewarded will be known to those skilled in the art of advertising and rewards schemes. For example, if the user has a rewards account with the shop in question, then rewards points could be added to that account in recognition of the user having illuminated the shop window. The time and date when the user caused the shop window lights to be illuminated can also be logged on the computer 48, together with the number of times a given user called, for subsequent market research analysis.

A lottery or draw could also be performed without being associated with the turning on of lights. A lottery phone number could be published. People ringing this number could then be entered in a draw, or a prize awarded to every nth person to call (e.g. every 1000th person). Using the above-described "delay" feature (i.e. refusing the incoming connection request from the user's phone after a predetermined time), it would be possible to inform the user that they are a winner immediately when they call.

Embodiment 3

Remote Control Module for Appliances

This embodiment provides a simple way for a user to control the switching on or switching off, by network-based remote control, of any appliance that can be plugged into a mains electricity socket.

Figure 6:
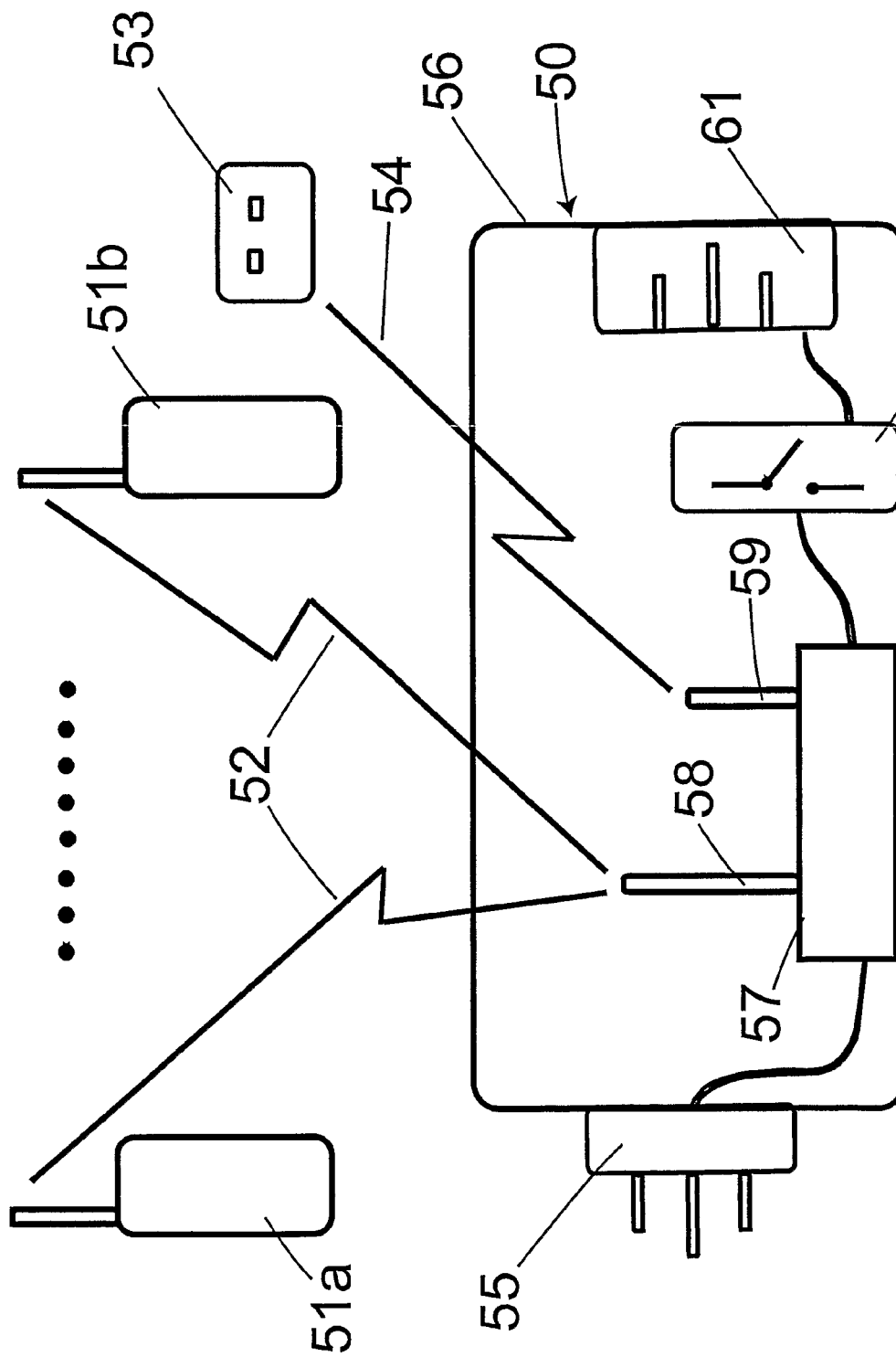
FIG. 6 illustrates a remote control device having a mains plug and a mains socket for the remote control of an appliance over a telecommunications network.
Figure 7:
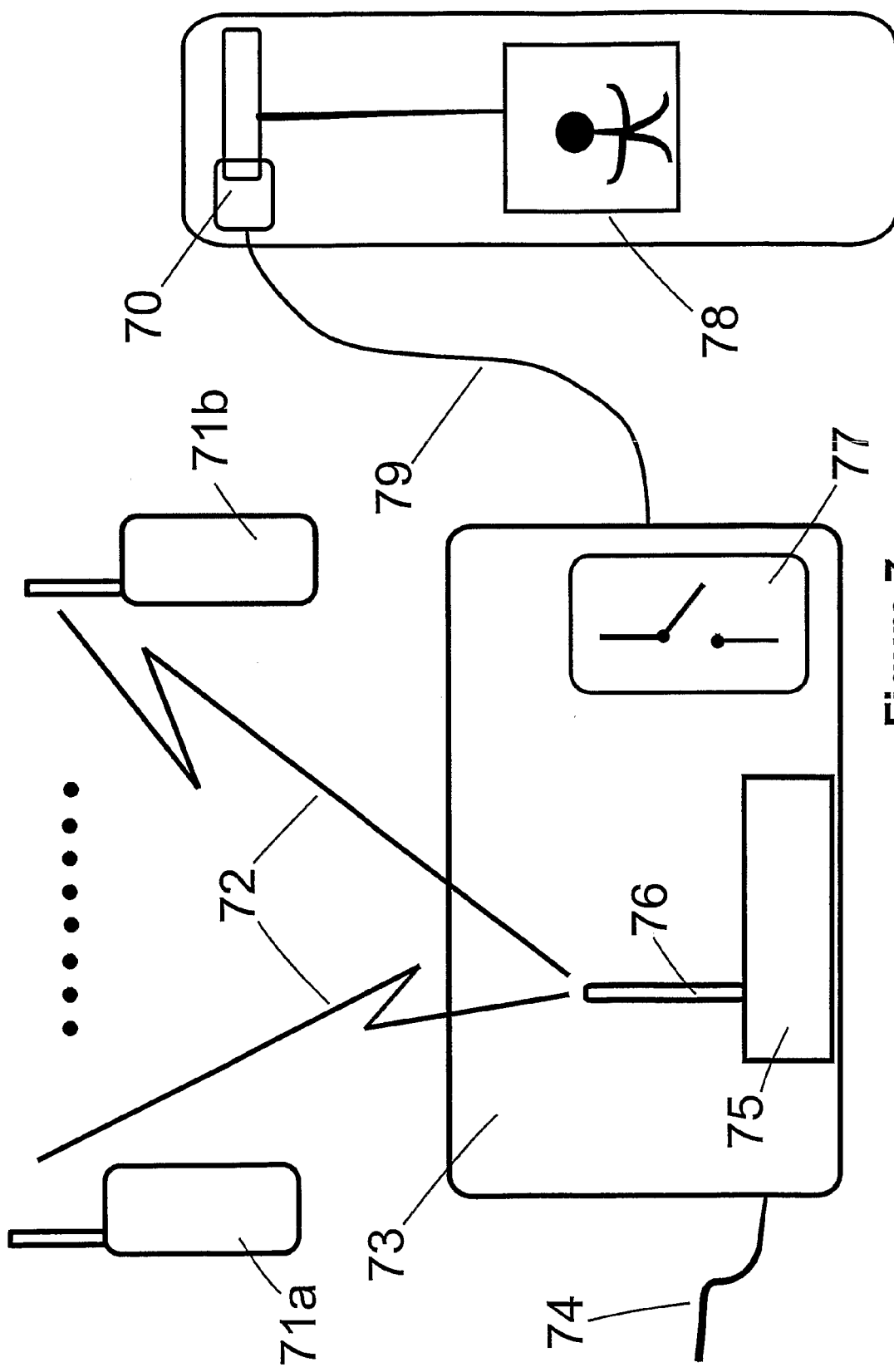
FIG. 7 illustrates a remote control device being used to enable a disabled person to summon an elevator or lift using a telecommunications network.

The presently preferred outward form of this embodiment is broadly similar to existing timer modules that can be used to control the switching on or switching off of a domestic appliance, such as a television or light, for example when the user is away on holiday. As shown in FIG. 6, a remote control module 50 according to this embodiment has a unitary housing 56, on one side of which is a mains plug 55, and on the other side of which is a mains socket 61.

In use, the mains plug 55 is plugged into a mains socket (e.g. in the user's home), and then the mains plug of an appliance (e.g. a coffee maker) is then plugged into the socket 61.

When plugged into a mains socket, the mains plug 55 provides electricity for the remote control electronics as well as the connected appliance.

It will be appreciated that the appliance's own on/off switch needs to be left in the "on" position all the while the appliance is plugged into the remote control module 50, in order for the module 50 to be able to switch the appliance on or off as instructed by the user by remote control.

Inside the housing 56 is a telecommunications antenna 58 connected to a remote control unit 57, which may be substantially the same as that shown in FIG. 3, as previously described. When connected to the electrical mains, the remote control unit 57 is able to receive a connection request from a remote telephone (e.g. 51a or 51b) via a telecommunications network 52 and the antenna 58.

To remotely turn on the electrical appliance, the user dials the phone number of the remote control unit 57. On receipt of the incoming connection request from the user's phone, the control unit 57 causes a switch or relay to be closed, thereby connecting the mains electricity supply to the appliance via the plug 55 and socket 61, and causing the connected appliance to be turned on. In the preferred embodiment the incoming connection request refused, so that the user does not incur a connection charge.

A similar procedure may be used to turn an appliance off, the incoming connection request being used to cause the switch or relay to be opened, thereby disconnecting the mains electricity supply from the appliance.

The remote control unit 57 may incorporate a memory to store the status of the switch or relay, so that, on receipt of an incoming connection request, the processing means within the control unit can determine whether the switch is to be opened or closed, i.e. whether the device is to be turned off or on. Optionally, the control unit 57 may be configured to wait for a predetermined time period before refusing the connection request. As with the previous embodiments, this time period may be set by the processing means in order to provide status information to the user, such status information being conveyed to the user by way of the duration of ring tones heard by the user before the connection request is refused. Alternatively the system may call the user back, or send him a text message, in order to convey the relevant information.

The remote control module 50 may be provided with a master on/off switch 60, e.g. in series with the plug 55 and socket 61, to turn the control module on or off.

The remote control unit 57 shown in FIG. 6 is also provided with a local receiver 59, operable to receive remote control signals from a local transmitter 53 (which may be, for example, infra-red or radio frequency). Thus, the remote control unit 57 serves as a multiple receiver unit, responsive to both network-based remote control instructions and to local remote control signals 54 from a local transmitter 53.

A multiple receiver unit, responsive to both local and network-based remote control instructions, may also be incorporated in the other embodiments described herein.

The multiple receiver unit 57 may be configured to be responsive to any one of a number of different local control signal patterns. Conventionally, with prior art local remote control systems, the receiver unit needs to be configured (e.g. by adjusting DIP switches in the receiver and/or transmitter) such that the receiver knows which signal pattern it is to respond to. However, with the present embodiment, the user may press a setup button on or within the housing 56, to inform the processor (or other programmable device) that a new local signal pattern is about to be taught to the device. Then, by sending a specimen signal from the local transmitter 53 to the device 50, the signal pattern may be programmed into the device 50 such that it will respond to that signal pattern in the future. This may also be done by sending the signal first and then pressing the program button, or by automatically programming every transmitter which sends a signal for a certain length of time or in a specified sequence.

Embodiment 4

Remote Control Lift Summoning, for Example for Disabled People

The embodiment that will now be described provides a way in which a person may summon a lift or elevator, if the conventional "call" button on the wall outside the lift is out of the person's reach. This embodiment is particularly suitable (but by no means limited) for use by disabled or handicapped people.

In this embodiment, a remote control unit 73 is installed in a building having a lift 78. The control unit 73 is connected by a wired or wireless connection 79 to the lift control electronics 70 and the associated drive motor. Typically, the remote control unit 73 may be connected in parallel with the conventional call buttons. The remote control unit 73 has a power supply 74 and a master on/off switch 77.

Internally, the control unit 73 includes a telecommunications antenna 76, a remote control receiver and transmitter unit 75, and a processor and other components as previously described with reference to FIG. 3. In use, the control unit 73 is connected to a power supply and the transceiver 75 is connected to a telecommunications network 72 to enable it to receive an incoming connection request from a phone (e.g. 71a or 71b).

On each floor of the building, alongside the conventional lift call buttons, a telephone number is displayed for use by disabled people to summon the lift to that floor. A different phone number is displayed on each floor, specific to that floor. Alternatively, perhaps to prevent misuse, the telephone numbers may be conveyed to disabled users by some other means, for example by providing the users with an information leaflet when they enter the building.

A separate remote control transceiver 75, having a single floor-specific telephone number, may be provided for each floor, with each transceiver being connected to the lift control circuitry. Alternatively, a single transceiver 75 may be configured to respond to a plurality of dialled phone numbers corresponding to the different floors.

In use, a disabled person on a particular floor, who wishes to summon the lift 78, dials the phone number corresponding to that floor, which has the effect of sending a connection request from the user's mobile phone 71$a$ via the network 72 to the remote control transceiver 75. In the preferred embodiment the incoming connection request is refused, so that the user does not incur a connection charge. Depending on the phone number dialled, the control unit 73 then controls the lift circuitry, sending the lift to the floor corresponding to the number dialled by the user.

Optionally, the control unit 73 may be configured to wait for a predetermined time period before refusing the connection request or calling the user back. This time period may be set by the unit's processing means in order to provide confirmation to the user that the lift has been summoned, or to convey other status information, as described previously.

With such a system installed, it is also possible (at next to no extra cost) to connect the alarm button in the lift, via connection 79, to the transceiver and transmitter unit 75, and to transmit and reset the alarm with the procedure previously described in connection with the photocell sensor alarm. Unit 75 may be extended to include an audio system, in which case it would be possible to talk to people in the lift in case of an alarm. The alarm information sent from the lift can also include the phone number of the user who called the lift with his mobile phone, so that this person could be called back on his phone, too.

A similar system may be used to provide remote control operation of doors, doorbells or lights—again which may be of benefit to disabled users.

Embodiment 5

Recording and/or Restricting Personnel Movement

This embodiment provides a means for the movement of personnel or vehicles to be restricted, and/or to be recorded as they pass through doors, gates or other barriers. It is envisaged that this embodiment will be of particular use in large industrial sites, particularly those in which security is of high importance, or in large buildings such as hotels.

Figure 8:
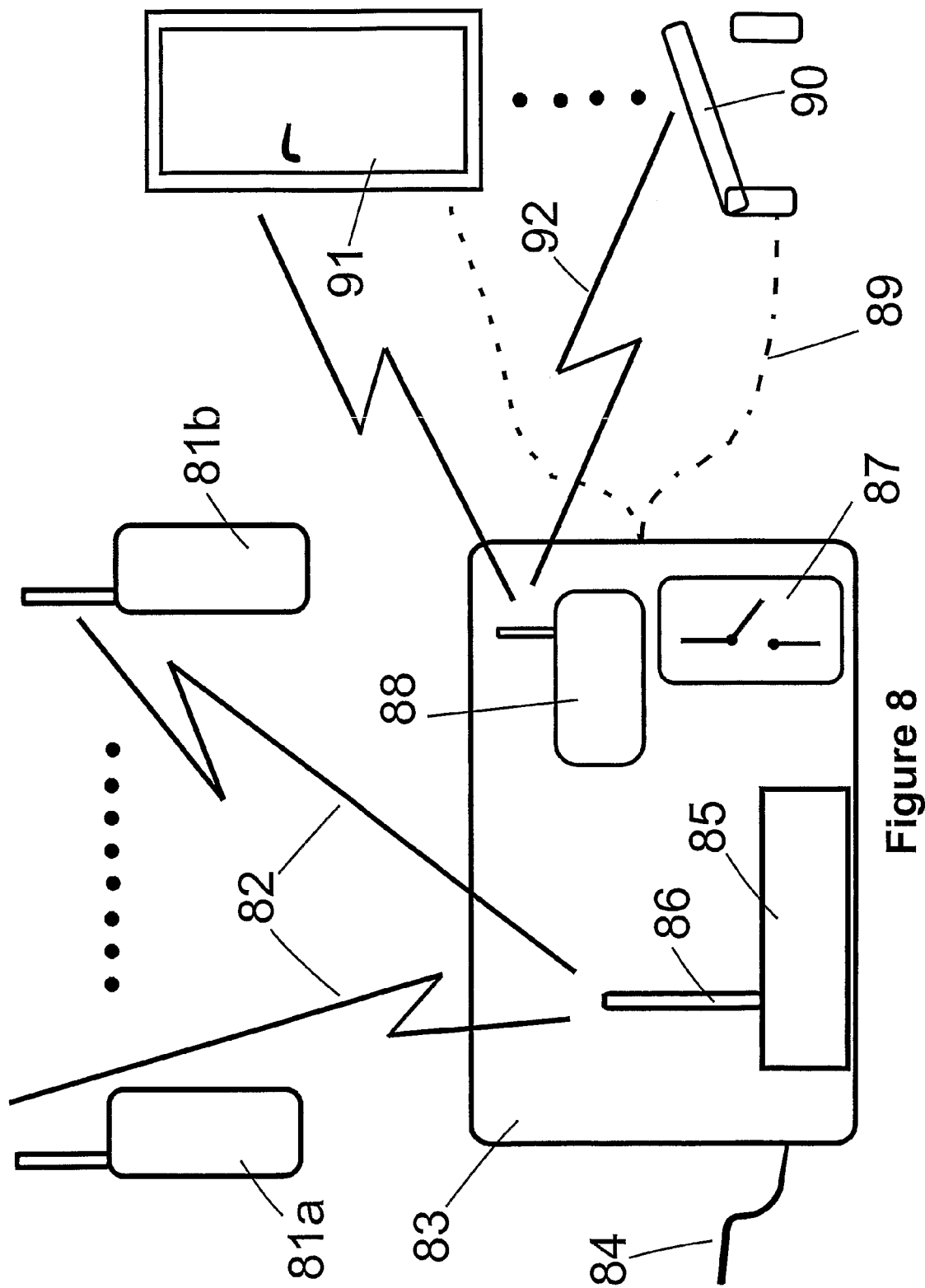
FIG. 8 illustrates the use of a remote control device to control and record personnel movement through a building or industrial site.

By way of example, FIG. 8 shows part of an industrial site having a vehicle access barrier 90 and a security door 91. Both the door 91 and the barrier 90 have electric motors or electronic locks, which are connected to a central access control unit 83, either using wired connections 89, or by wireless links 92 to a wireless transceiver 88.

The control unit 83 has a power supply 84 and includes a telecommunications antenna 86, a remote control transceiver unit 85, and a processor and other components as previously described with reference to FIG. 3. In use, the control unit 83 is turned on and the transceiver 85 is initialised on a telecommunications network 82 to enable it to receive an incoming connection request from a phone (e.g. a mobile phone 81$a$ or 81$b$).

Around the site, alongside doors or barriers, telephone numbers may be displayed for use by authorised personnel, in order to unlock the corresponding door or to raise the corresponding barrier. A different phone number may be displayed alongside each door or barrier, specific to that location. Alternatively, the telephone numbers may be conveyed privately to authorised users.

In use, a person who wishes to pass through a door 91 or barrier 90 dials the phone number corresponding to that location, which has the effect of sending a connection request from the user's mobile phone 81$a$ via the network 82 to the remote control transceiver 85. The transceiver 85 is configured to respond to a plurality of dialled phone numbers, each corresponding to a different door, gate or barrier around the site.

In the preferred embodiment the incoming connection request is refused, so that the user does not incur a connection charge.

For security purposes, the control unit 83 may be configured such that it only responds to incoming connection requests from certain authorised phone numbers. Different users' phone numbers may be authorised for opening different specific doors, gates or barriers. The processor within the control unit is configured to identify the telephone number from which the incoming connection request originated and to verify whether this telephone number is on a list of authorised telephone numbers for the specific door, gate or barrier that is desired to be opened.

Provided the telephone from which the connection request originated is authorised for opening that specific door, gate or barrier, the control unit 83 causes that door, gate or barrier to be opened or unlocked as appropriate, e.g. by sending a control signal from the transceiver 88 to the door 91. Thus, a mobile phone or the like may be used in place of a security access card to enable an authorised user to enter a restricted location. Authorisation to temporary personnel, such as contractors, or guests in a hotel, may be granted on a temporary basis.

Optionally, the control unit 83 may be configured to wait for a predetermined time period before refusing the incoming connection request. This time period may be set by the unit's processing means, in order to provide confirmation to the user that the door, gate or barrier will been opened as desired, or to convey other status information, as described previously.

Another option is to set the system to send information to predetermined people (i.e. to their respective phone numbers) if certain areas are accessed or if certain people (i.e. their respective phone numbers) try to access certain areas.

On opening the door, gate or barrier, the control unit 83 stores the telephone number from which the connection request originated, together with the time and date of the connection request. This enables a comprehensive record of personnel movement through that door, gate or barrier, and indeed throughout the entire site, to be produced. A security officer can also determine who has entered a certain area, and whether this person is an employee who knows the area, or is someone such as an external contractor who needs to be informed about escape routes in case of an accident in the area.

As well as in industrial complexes and other secure sites, it is envisaged that this embodiment will be of particular use in hotels. With this embodiment, hotel guests need not be given a room key when they check in. Instead, the control unit 83 can be connected to the hotel computer and configured so that individual guest room doors can be opened by the mobile phones of the corresponding guests. A guest's mobile phone number may be authorised for remote control opening of the main entrance, car-park and appropriate room(s) etc. when he checks in, and his number can automatically be deleted when the guest checks out. The guest could give his number by simply making a call to a given phone number of the remote control system. This call may be free of charge. This provides the additional advantage that the system always gets the right phone number and that people in the hotel know the mobile phone numbers of all guests (which may be useful in case of emergency, or for the hotel's promotional or marketing purposes, etc.).

Embodiment 6

Conveying Information Over a Telecommunications Network

Another embodiment provides a method and corresponding device for conveying information over a telecommunications network. Processing means are connected to a telecommunications transceiver; and the transceiver is connected to the network. On receipt of a connection request from a user; the processing means and transceiver wait for a time period representative of the information to be conveyed; and then refuse the connection request.

This has a variety of possible applications, and enables information to be conveyed to the user by virtue of the duration of the "wait" period or the number of ring tones heard by the user before the system refuses the incoming connection request. The "information" may be, for example, confirmation that a remote event has taken place, the status of a remote device or machine, or even a piece of general information such as a weather forecast (e.g. a short ring for fine weather, or a long ring if rain is expected), or a sports result (e.g. a short ring if team "A" won, or a long ring if team "B" won). Since the system refuses the incoming connection request, the user is not charged (in many countries) for calling the system.

In a further embodiment, processing means are connected to a telecommunications transceiver, and the transceiver is connected to the network. In use, the processing means and transceiver are configured to send a connection request to the user (e.g. in response to some other action or event), wait for a time period representative of the information to be conveyed, and abort the connection request.

This advantageously enables information to be conveyed to the user by virtue of the duration of the "wait" period or the number of ring tones heard by the user before the system aborts its outgoing connection request. Since the system aborts the outgoing connection request, in many countries this service may be provided without a telecommunications charge.

The processing means may be configured to send the connection request to the user in response to the occurrence of a remote event or a change in status of a remote device.

Alternatively, the processing means may be configured to send the connection request to the user following the receipt of a connection request or a telecommunications message from the user. The user could call the telephone number of the system and then hang up, or his call may be automatically rejected by the system, thereby avoiding a connection charge. The system would then effectively call the user back (by sending the outgoing connection request) and the user's phone would ring for a certain duration or number of rings before the system aborts the connection request (i.e. effectively "hangs up"). Through the duration or number of rings generated by the user's phone, the information is thereby conveyed to the user without incurring a connection charge

Embodiment 7

Programmed Mobile Station

Instead of using a dedicated remote control transceiver to enable a device to be remotely controlled via a telecommunications network or to send information via the network, a mobile phone (or a personal digital assistant or some other kind of mobile station) can be used for this purpose. An output from the mobile phone may be connected to an external device which it is desired to control remotely, with the external device and the phone arranged such that the external device is responsive to the signal through the mobile phone's output. For example, the output from the phone may be connected in parallel with the control switch of a door control unit. The phone is programmed to control the signal through the outputs or from the inputs in response to an incoming connection request, thereby to control the external devices and/or send information. The I/O (input/output) may be wired (e.g. one which is usually used for a headset) or may be a wireless I/O interface (e.g. Bluetooth® or infra-red).

In use, on receipt of a connection request from a user dialling the number of the "slave" mobile phone (e.g. the phone within the house that is connected to the door opening control unit) the "slave" mobile phone will cause the door to be opened, or some other remotely-controlled action to be performed. Alternatively, or in addition, if an input signal is detected by that mobile phone (e.g. from an alarm sensor), then associated information (e.g. alarm information) may be sent to the user.

The software in such a "slave" mobile phone (or other mobile station) may be programmed to provide dedicated "remote control" and/or "alarm" menus, through which the user may configure the "slave" functionality of the phone. Through these dedicated menus the user may specify how the "slave" phone is to control an external device to which it is connected, the form of the signals to be sent between the "slave" phone and the external device, and how the "slave" phone is to handle any alarm signals it receives.

Another such system may be responsive to incoming text messages/SMS messages. The use of text messages advantageously enables the remote control functions to be significantly extended, and enables the use of different inputs and outputs. In use, a Bluetooth® or infra-red connection could connect the "slave" mobile phone to the device it is to control (e.g. a domestic lighting and heating control unit). A number of different commands could be included in a single text message. Logical operators and/or conditions could also be included. Thus, for example, a text message could be sent from the remote user reading: "Switch on lights in room 1, 3, 6..., switch off lights in room 8, 9..., if temperature is below 18C turn on heating..."

Different actions could thus be started by a user sending a single text message to the "slave" mobile phone. The "slave" mobile phone could then send different pieces of status information and/or confirmatory information to the user's remote phone, which may be done in a single text message.

With reference to FIG. 3, such a "slave" mobile phone could completely replace antenna 26, transceiver 33, processor 36, inputs 39, and partly the power supply 37 and the output 34. Thus, some of the more expensive parts of such a system could be replaced by a cheap mobile phone. The software (optionally with the above-described "delay" feature in which the incoming connection request from the remote phone is refused after a predetermined time) stored in the processor unit 36 would be stored in the mobile phone and could easily be configured using a dedicated "remote control" menu and the mobile phone's user interfaces (e.g. keypad, display).

By using wireless I/O-interfaces of such a mobile phone, all devices with compatible interfaces could be remote controlled (worldwide). If mobile phone companies and manufacturers of electronic devices agree on a remote control standard, any mobile phone could be used to remote control almost any electronic system. All one would have to do is to turn on the mobile phone, configure the remote control menu and put the mobile phone within the range covered by the wireless interfaces. With reference to the example described in connection with FIG. 6, the user may switch on a coffee machine (with a wireless interface) in his kitchen whilst he is driving home from work, by using the mobile phone in his car to dial the number of a "slave" mobile phone in his home that is in wireless communication with the coffee machine. Depending on the settings in the remote control menu of the mobile phone in the home, the coffee machine could be switched off by a subsequent connection request, and/or automatically after a set time.

Mobile phones with the described features could easily be used as alarm systems. All that has to be done is to supply an input-signal of any sensor (wired of wireless) to the phone and configure a dedicated "remote control" menu or "alarm" menu. Existing alarm systems can easily be extended by such a mobile phone to send an alarm information (call or text message) to any phone.

The incoming connection request is preferably refused, so that the user does not incur a connection charge. Outgoing information can be sent as calls (the user need not incur a connection charge) or as text messages.

For this purpose, the mobile phone may be an outdated model that the owner no longer uses on a day-to-day basis (but which nevertheless has the described features), and so this provides a good way in which old mobile phones may be re-used, thereby saving costs and benefiting the environment.

A mobile phone (or other mobile station) may be programmed on manufacture, or reprogrammed (e.g. via a SIM upgrade or a SIM update) to enable it to be used as a remote control I/O-system. The software program (and respective menu, etc.) for the remote control application of a mobile phone may be supplied via a telecommunications network, or on an appropriate data carrier (e.g. a SIM card or smart card).

Embodiment 8

Mobile Station with Remote Control Menu

A mobile phone (or other mobile station) may be provided with a dedicated remote control button or menu option which is configured to dial a telephone number for causing a remote device to be remotely controlled, in a manner as previously described herein. Such a button or menu option enables the user to easily perform the corresponding remote control operation, such as the remote opening of a door, gate, shutter or barrier.

Alternatively, or in addition, a mobile phone (or other mobile station) may be provided with one or more dedicated directories of telephone numbers which are each for causing a corresponding device to be remotely controlled. Such directories provide organised lists of the various remote control operations available to the user, and facilitate their use.

A mobile phone (or other mobile station) may be programmed on manufacture with such a menu option or directory structure, or may be reprogrammed (e.g. via a SIM upgrade or SIM update) to provide this functionality. The reprogramming may be performed via a telecommunications network, or via an appropriate data carrier (e.g. a SIM card or smart card).

Mobile phones with the described features could easily be used as alarm systems. All that has to be done is to supply an input-signal of any sensor (wired of wireless) to the phone's inputs (wired or wireless). Existing alarm systems can easily be extended by such a mobile phone to send an alarm information (call or text message) to any phone.

All of the above-mentioned functionality, and all the functions described with the other embodiments described herein, may be integrated into the standard software, hardware or firmware of a mobile phone.

Indeed, features of any of the embodiments and aspects of the invention described herein may be combined in other configurations and combinations, as will be appreciated by those skilled in the art.

Embodiment 9

Use of a Mobile Station (Especially a Mobile Phone) as a Universal Handheld (Human-) Device Interface Microcontrollers are used in a growing number of devices because they are smart, small and low priced. However, a major problem with many microcontroller based systems is the human-device-interface (HDI) or control panel, i.e. the interface which enables information to be exchanged with the user. Such an interface is often the most expensive part of a system and needs a lot of space (e.g. for a display and keyboard). Mainly because of lack of space and costs, many devices do not have an HDI at all. Other systems can only be set up using buttons and light emitting diodes. To set up such a system can be complicated, and in many cases can only be done by consulting a user manual. To overcome these problems many devices have an interface to connect the device to a personal computer (PC) system or similar system, in order to perform setup or administrator functions.

Many of the remote control systems previously described herein may be connected in such a manner to a PC system, in order to be configured by an administrator or security officer, for example to specify the telephone numbers of authorised users from which incoming connection requests will be acted upon, or to configure the remote control actions to be performed. However, in some cases it may be impractical or prohibitively expensive to provide a PC or a dedicated keypad and display for such purposes. This may particularly be the case when the remote control system is supplied for domestic use.

Other electrical appliances, devices and systems conventionally use an attached computer (or, at least, a visual display screen and a user input device such as a keyboard or trackball or mouse) to enable a user to perform setup functions or other tasks, or to provide input in a more general sense. However, in many situations this may not be feasible. For example, a small museum having limited funds may not be able to afford to provide interactive display screens alongside exhibits. A town or city council may be unwilling to install interactive terminals (e.g. to provide information for tourists about local landmarks) in public places, if there is a high risk of vandalism in that area.

To address these issues, this embodiment provides additional communications software in a mobile phone (or a PDA or other mobile station) to enable it to communicate, via a built-in local data communications interface, with another software-controlled device (such as a remote control unit as described above, for example, or an information server) having a compatible data communications interface. By connecting a mobile phone containing this terminal software to another system or device, by means of a standard interface, the user may use the keyboard and display of the mobile phone to comfortably exchange information with the other system or device. In this manner, a mobile phone can easily be used as a handheld terminal or a handheld programmer, with little or no extra costs.

Thus, such a mobile phone may be used to supply user input to the other electrical appliance, device or system, or to download new software from the mobile phone into such systems. It may be used, for example, for performing setup or administrator functions on a remote control unit as described in the embodiments above, or for obtaining information on a museum exhibit or public landmark. It should be stressed that many other applications are also possible, as will be readily apparent to those skilled in the art.

Modern mobile phones include one or more of a variety of different local data communications interfaces, such as Bluetooth®, infra-red or RS232. These interfaces are typically used to connect the mobile phone to PC systems to exchange information or to download new software from the PC to the phone. However, with the present embodiment, a mobile phone provided with the additional communications software can use one or more of these local data communications interface(s) (in particular the wireless ones) to communicate not only with PC systems but with any software-controlled device having a compatible interface. Using the present embodiment, such a software-controlled device would no longer need its own control panel or HDI. By using a mobile phone provided with the communications software, and by providing the software-controlled device with a compatible local data communications interface, the device could still be comfortably set up and controlled, with the user supplying input using the mobile phone's keypad and viewing the mobile phone's display.

In many such cases it will be cost effective to replace the control panel or HDI of existing devices by a suitable local data communications interface, to enable users to interface with the device using a mobile phone.

The present disclosure is intended to apply to any existing data communications interface which may be provided on a mobile phone, as well as to future data communications interfaces which have yet to be invented or developed.

The additional communications software provided in the mobile phone may be standard terminal software, or software using any other existing or future protocol.

A mobile phone having the additional communications software may be used to provide an alternative/replacement user interface for many electrical devices or systems. Such a mobile phone can provide a processor, memory (integrated or chip cards), a display, a keyboard, an interface and a power supply (battery).

With the present embodiment these parts of a mobile phone may all be used free of charge. The user need not provide a dedicated PC for performing administrator functions etc., and need not carry any extra equipment (such as a laptop PC) with him for such purposes. Instead, a mobile phone having an appropriate data communications interface and the additional communications software will provide the required functionality, to enable the user to interact with the electrical device or system in question. This may all be accomplished at no or next to no extra cost.

Integrated terminal software would change any mobile phone into a universal information system that could transfer information to and from the user. This system could also give the phone number or the IMEI number (the "International Mobile Equipment Identity" number—at present, every phone worldwide has a unique IMEI number that can not be changed) as an identification code over a standard data communications interface. Using this IMEI number, or any similar identity number that may be devised in the future, or by the use of passwords, the system may be configured such that only authorised persons can use certain services.

Any system containing software to communicate with standard terminals (e.g. RS232-terminals) could be connected (wirelessly or by wire) to such a mobile phone, without any hardware or software changes being necessary in the system to be connected to the mobile phone. The software in the phone could either automatically detect the host computer or could be manually set to the right terminal emulation type.

Using this technique, in museums, information about exhibits etc. could be given to visitors in different languages. The visitor would require a mobile phone having an appropriate data communications interface (e.g. Bluetooth®) and the new communications software. The museum would provide a server having a compatible data communications interface. The visitor may then use his mobile phone to communicate with the server via the Bluetooth® interface, by virtue of the communications software installed on the phone. This technique would also enable visitors to give feedback to the museum staff—for example to provide an opinion as to how interesting they consider a particular exhibit to be.

Using this technique, doors could be opened by a user typing a code number on the mobile phone keypad. The code number is transmitted via the phone's data communications interface (e.g. Bluetooth®) to a server having a compatible interface. The server then checks the code number that has been entered and opens the door if the code number is correct. For an additional level of security, the IMEI, the phone number or any unique identity code of the user's phone could also be transmitted to the server, which would check the number against a list of authorised numbers and only cause the door to be opened if both the code number is correct and the phone number is authorised.

Also using this technique, lights in shop windows could be turned on by the user sending a command via the phone's data communications interface (e.g. Bluetooth®) to a compatible lighting control system within the shop. Depending on the circumstances, this technique may be easier to implement and use than the one described in Embodiment 2 above, because the user would not need to know and dial any phone number, and the response would be immediate. Detailed information (e.g. text and photos) about the products displayed in the window could be sent back to the user. By providing a short-range data communications transceiver in each window of a large shop having many windows, and identifying which receiver receives the user's command, the shop can determine the user's position in front of the store and can customise the data sent back to the user accordingly.

One of the advantages of such an information system is that many people in a limited area can be reached. The connection between a user's mobile phone and a server could be automatically established, in the same way as a computer can automatically identify a mobile phone having an infra-red interface as soon as the phone is within reach of the computer's local transmitter.

The range that is covered by standard short distance transmitters can easily be expanded by using multiple transmitters or by using amplifiers.

A mobile phone in accordance with this embodiment may have a dedicated "local comms" or "terminal" menu programmed into the phone's software or firmware, from which the phone's local data communications or terminal functions may be accessed.

As an example of the use of such a phone, in an airport building a user could set the phone to the "terminal" menu, upon which the phone would perform a setup or handshaking routine to establish a local data communications connection between the mobile phone and the airport's information server. The user could then, for example, enter the word "PARIS" into the mobile phone, upon which he would then receive information from the airport's information server about flights to or from Paris. This information could be automatically tailored according to the user's actual location in the airport. For example, if the user is in the Departures section of the airport (i.e. the user's phone interfaces with a transceiver in that specific location) then the information could be tailored to relate to departures for Paris. Conversely, if the user is in the Arrivals area, then the information could provide details of planes arriving from Paris.

As further example, such a mobile phone could be used to interface with the engine management system or onboard computer of a car. If the car breaks down, then the user could use his phone to read out the error memory of the car and send this information to a garage, or to perform other diagnostic checks and send a corresponding report to a garage.

Figure 13:
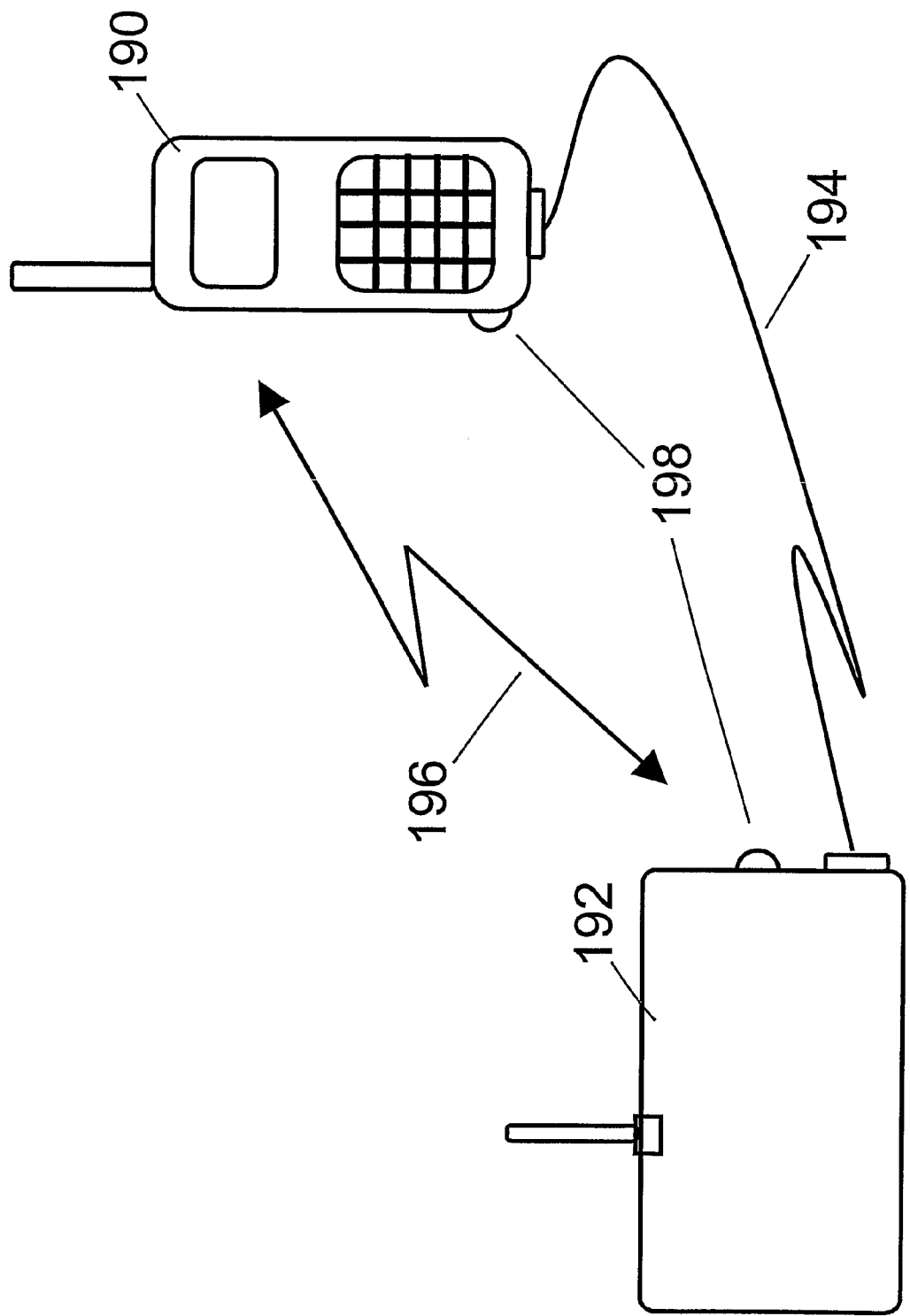
FIG. 13 illustrates the use of a mobile phone to exchange data with a processor-controlled device, for example to perform setup or administrator functions on a remote control unit.

FIG. 13 shows an example of a mobile phone 190 provided with terminal communications software, being used to configure a remote control unit 192 of the type described in Embodiment 1 above. The mobile phone 190 may communicate with the control unit 192 using a cable connection 194, a wireless link 196 (e.g. radio frequency or Bluetooth®), or via an infra-red link 198. For the purposes of illustration this figure shows all three of these communications links (194, 196, 198) being used simultaneously, although in practice they would generally only be used separately.

With this new communications software, the mobile phone 190 may be used to perform inter alia the following administrator or setup functions on the remote control unit 192:
   store authorised phone numbers
   delete authorised phone numbers
   set priorities
   set the number of ring signals or time delay used to provide feedback information to the user
   set the times when the system can be used
   read a log of when the system was used
   locally operate the system using a built in local transceiver, e.g. Bluetooth®, instead of using a local remote control transmitter
   download new control software from the mobile phone into the system and many other functions that would otherwise only be accessible using a PC system.

With the new software, the user simply selects the "terminal" menu on the phone and connects the phone to the host system. After sending a character form the phone to the host system, the host will respond by sending a start text to the phone and the connection will be established. The host will then be able to communicate with the user. In most cases, the user will not require a user manual in order to be able to change the settings of the host system, because all the information he needs can be given by the host system.

After the setup operation is finished, the phone can be disconnected from the host system and set back to the standard telephone menu, for use like any other mobile phone.

Further Advantages of Using Mobile Phones for Terminal Purposes
   By using a mobile phone and a wireless link, no display or keyboard can be destroyed by vandalism or damaged by environmental effects (e.g. rain, corrosion, etc.)
   The user is familiar with the menu-driven handling and the keyboard of his phone—in contrast to operating other systems.
   Almost everyone nowadays carries a mobile phone . . . but not a PC.
   in connection with systems such as the one described in Embodiment 1 above, a mobile phone can be used to locally operate as well as to setup the system.
   Mobile phone companies will be able to sell more phones if they contain the additional communication features and software.
   They could also use their developed products without the "phone part" as multifunctional handheld terminals.
   For use as a local terminal or an HDI or control panel, a mobile phone does not need a SIM card (or contract), or any of the other components generally provided in mobile phones for network telecommunications purposes, such as a GSM-modem, an antenna, an HF-amplifier etc. Thus, an old phone that is no longer required for network telecommunications could still be used as a handheld terminal, provided it has a suitable local data communications interface.

Embodiment 10

Use of a Mobile Phone as an RFID Terminal

RFID, short for radio frequency identification, is a technology similar in theory to bar code identification. With RFID, electromagnetic or electrostatic coupling in the RF portion of the electromagnetic spectrum is used to transmit signals. An RFID system consists of an antenna and a transceiver, which read the radio frequency and transfer the information to a processing device, and a transponder, or tag, which is an integrated circuit containing the RF circuitry and information to be transmitted.

RFID systems can be used just about anywhere, from clothing tags to pet tags to food—anywhere that a unique identification system is needed. The tag can carry information as simple as a pet owner's name and address, or the cleaning instruction on a sweater, to as complex as instructions on how to assemble a car. Some auto manufacturers use RFID systems to move cars through an assembly line. At each successive stage of production, the RFID tag tells the computers what the next step of automated assembly is.

One of the key differences between RFID and bar code technology is that RFID eliminates the need for line-of-sight reading that bar coding depends on. Also, RFID scanning can be done at greater distances than bar code scanning. In the case of supermarket shopping, an RFID tag attached to each item of shopping would enable an entire trolley of products to be scanned at once at the checkout.

At present there are active and passive tags available. Passive tags get the energy they need from the transmitter of the reader, whereas active tags have their own power supply (i.e. a battery).

RFID tags are expected to play an important part in our future life. As these tags contain information, there is a growing need for systems that can read this information. Handheld RFID systems are already on the market, but they are expensive and no one would wish to carry such a device with him all the time.

Adding RFID functionality to a mobile phone is the ideal solution to this problem.

The principal components of a device for reading and/or writing onto RFID devices are: a processor, memory, a display, a keyboard and a power supply. Every standard mobile phone already contains these components. All that needs to be added is an RFID interface and the software to control it.

Figure 14:
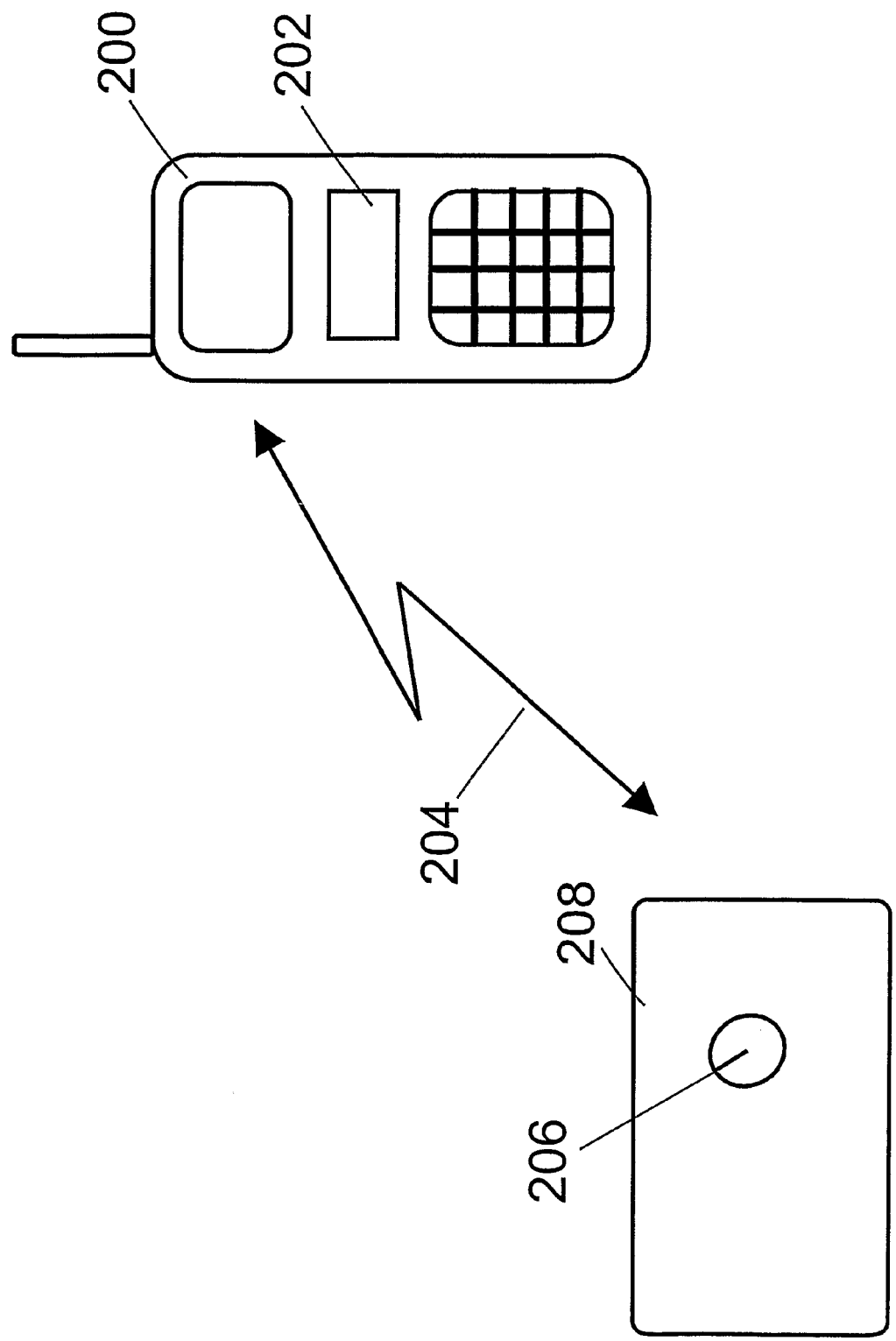
FIG. 14 illustrates the use of a mobile phone to exchange data with a radio frequency identification (RFID) tag.

FIG. 14 shows an example of a mobile phone 200 provided with an RFID interface 202. This phone could, for example, be used to read RFID-format price tags in a supermarket.

In use, the RFID interface 202 of the mobile phone 200 can be used to send or receive wireless RFID signals 204 to or from an RFID tag 206 attached to a package 208.

In use, the mobile phone 200 would first be set to an "RFID" menu, and the user would then follow instructions on the mobile phone's display. For example, the user could press a key, which would cause a signal to be sent to the RFID tag 206. RFID response information, received from the tag 206, would then be displayed on the mobile phone 200.

With this system, in a supermarket the staff would no longer need to attach any price labels to the goods themselves or display price information on the shelves. Instead, the supermarket management would only need to provide price information on their computer system, which in turn would cause the correct price information to be displayed on a customer's mobile phone via the RFID tag system. The supermarket and the customers can be sure that the pricing is current, and there will be no danger of a member of staff inadvertently displaying an incorrect price label on a shelf. Moreover, the supermarket can instantly update product prices (potentially across an entire chain of stores at once) by entering the new prices on a single computer. This will save time and money, since personnel will not need to update the price labels on the products themselves or on the supermarket shelves.

When a mobile phone is used to obtain pricing information from an RFID tag, relevant information about the product, or information about any applicable special offer, may also be provided to the user via the mobile phone. This information may be provided free of charge by means of the build in interfaces, rather than over the mobile phone network.

A mobile phone may be provided with an RFID interface and software, and also a local data communications interface and terminal software (as described in Embodiment 9 above), to enable the mobile phone to read RFID data from an RFID tag and then interrogate a local information server for the corresponding data (e.g. the product price or product information).

If a customer of a supermarket does not own an RFID-compatible mobile phone, then the supermarket could lend one (or any other type of RFID reader) to the customer for use within the store. If a mobile phone is to be lent to a customer for such a purpose, then it could be configured such that it can only be used for determining product prices, thereby providing the customer with no motivation to steal the phone from the store. Alternatively the RFID-compatible mobile phone could be attached to a shopping trolley, or even integrated with the trolley (e.g. in the trolley handle), to further deter theft.

At a checkout in a supermarket, a customer could simply hold his mobile phone near his trolley and thereby obtain a price for all the goods in the trolley. Moreover, if the mobile phone is provided with a facility to handle financial transactions, then he could use the mobile phone to pay for the goods in the trolley.

Standard interfaces of a mobile phone could be used to download and store RFID information in the phone, or to transfer RFID information from the phone to other systems. Thus product and price information could be stored in the phone, and information could be sent worldwide. It would also be possible to acquire RFID product information from a supermarket by mobile phone and to download and store this information in the phone.

The invention claimed is:

1. A device for activating an event such as switching a device on or off, or opening or closing a member such as door, a window, a shutter, a curtain, a gate or a barrier said device comprising:
    a telecommunications receiver operable to receive a connection request from a user,
    memory means for storing the state an article was in prior to the receipt of the connection request, and
    processing means connected to a telecommunications transceiver and having an output for activating an opening or closing event;
    and wherein the processing means are operable, on receipt of a connection request, to:
        wait for a predetermined time period which time period is automatically varied dependant on the state the article was in prior to the receipt of the connection request;
        refuse the connection request; and
        activate the event,
        whereby a member such as a door, a window, a shutter, a curtain, a gate or a barrier is openable or closeable remotely by communication over a telecommunications network and whereby the open or closed status of the member is fed back to the user via the telecommunications network by the automatic variation in the said predetermined time period.

2. A device as claimed in claim 1, wherein the processing means are further configured to detect that the user has terminated the connection request during the said predetermined time period; and, in response, are configured not to activate the event.

3. A device as claimed in claim 1 or claim 2, wherein the processing means are configured to set said time period to a first time period if the article was in the first state prior to the receipt of the connection request, and to set said time period to a second time period different from the first time period, if the article was in the second state prior to the receipt of the connection request.

4. A device as claimed in claim 1, wherein the processing means are configured to receive input from a sensor for detecting status of the member such as an error or incident in the vicinity of the member prior to the activation of the event, the processing means being further configured not to activate the opening or closing event in response to such an error or incident and to set the said time period to a third time period, different from the first and second time periods thereby to provide user feedback of the error or incident.

5. A device as claimed in claim 1 arranged to send the user a text message, or phone him back to play a pre-recorded audio message to provide status information about the member.

6. A device as claimed in claim 1 wherein the processing means are arranged to return status information to the user if a call is terminated by the user before any of the said predetermined time periods have expired.

7. A device as claimed in claim 1 arranged to return status information to a user the status information being selected from a group containing input from a sensor for detecting status of the member such as an error or incident in the vicinity of the member prior to the activation of the event and the stored the state the article was in prior to the receipt of the connection request.

\* \* \* \* \*